United States Patent
Oaku et al.

(10) Patent No.: US 7,221,083 B2
(45) Date of Patent: May 22, 2007

(54) LIGHT EMITTING DEVICE

(75) Inventors: Hitoshi Oaku, Tokyo (JP); Choichiro Okazaki, Kodaira (JP); Masatoshi Shiiki, Musashimurayama (JP)

(73) Assignee: Hitachi, Ltd., Tokyo (JP)

( * ) Notice: Subject to any disclaimer, the term of this patent is extended or adjusted under 35 U.S.C. 154(b) by 116 days.

(21) Appl. No.: 11/135,292

(22) Filed: May 24, 2005

(65) Prior Publication Data

US 2005/0264161 A1   Dec. 1, 2005

(30) Foreign Application Priority Data

May 27, 2004 (JP) ............... 2004-157036
Jan. 27, 2005 (JP) ............... 2005-019242

(51) Int. Cl.
*H01J 1/62* (2006.01)
*C09K 11/08* (2006.01)

(52) U.S. Cl. ............... 313/485; 252/301.4 S; 252/301.6 R (58) Field of Classification Search ........ 313/483–487, 313/582–587; 252/301.4 R, 301.6 R, 301.4 S, 252/301.4 F
See application file for complete search history.

(56) References Cited

FOREIGN PATENT DOCUMENTS

| CN | 1325124 | 12/2001 |
|---|---|---|
| CN | 1494729 | 5/2004 |
| JP | 2003-132803 | 5/2003 |
| JP | 2003-142004 | 5/2003 |
| JP | 2003-242892 | 8/2003 |
| JP | 2003-346660 | 12/2003 |
| JP | 2004-176010 | 6/2004 |

OTHER PUBLICATIONS

Phosphor Handbook (In the Electrochemical Society of Japan), III, Chapter 2, pp. 219-223, (1987) with English Translation of Section 3.
IDW '00 Proceedings Of The Seventh International Display Workshops, pp. 639-642 (2000).
Technical Report of IEICE, EID 2003-69 (Jan. 2004), pp. 45-48.
Flat Panel Display 2003 (Jitsumu-hen) (In Japanese), Part 7.1, pp. 210-217 (2002) Nikkei Business Publications, Inc. attached English translation of main part.

*Primary Examiner*—Joseph Williams
(74) *Attorney, Agent, or Firm*—Antonelli, Terry, Stout & Kraus, LLP.

(57) ABSTRACT

A blue-emitting phosphor is optimized by controlling mole fractions typically of Mg and Si in $Sr_{3-e}Mg_bSi_2cO_{8d}$:$Eu_e$ or by further including an optimal amount of at least one additional component such as Ba or Ca. The resulting phosphor exhibits a higher brightness and a higher color purity upon excitation by ultraviolet light emitted as a result of discharge of xenon gas. The optimized phosphor is incorporated into light emitting devices such as lamps and PDPs, and further into display devices.

28 Claims, 6 Drawing Sheets

LIGHT EMITTING DEVICE

CLAIM OF PRIORITY

The present application claims priority from Japanese application serial no. 2005-19242, filed on Jan. 27, 2005, which further claims priority from Japanese application serial no. 2004-157036, filed on May. 27, 2004, the contents of which are hereby incorporated by the reference into this application.

FIELD OF THE INVENTION

The present invention relates to light emitting devices such as tubular or flat-panel fluorescent lamps or plasma display panels containing phosphors, typically EU-activated silicate phosphors, being excited by the action of ultraviolet light, typically vacuum ultraviolet light, to thereby emit light. It also relates to image display devices (hereinafter briefly referred to as display devices) using the light emitting devices.

BACKGROUND OF THE INVENTION

Demands have been increasingly made to reduce the thickness of display devices such as television sets and personal computer monitors for saving spaces. As such display devices that can be slimmed, plasma display (PDP) devices, field emission display (FED) devices, and liquid crystal display devices containing a backlight and a thin liquid crystal panel have been increasingly developed.

The plasma display devices use a plasma display panel as a light emitting device. The plasma display panel includes micro discharge spaces each containing a rare gas, and a phosphor layer arranged in each micro discharge space. The plasma display panel is so configured as to emit light in the visible region (visible radiation) by exciting a phosphor in the phosphor layer upon irradiation with ultraviolet light emitted in a negative glow region in the micro discharge space as an excitation source and thereby accelerating light emission of the phosphor. The ultraviolet light has wavelengths at 147 nm and 172 nm when xenon gas is used as the rare gas. The plasma display deices display images by controlling the intensity (quantity) and color of the light emission of the plasma display panel.

The liquid crystal display devices include a backlight and a liquid crystal panel, which liquid crystal panel contains a pair of electrodes and a liquid crystal sandwiched between the at least one pair of electrodes. They display desired images in which the quantity and/or color of light emitted from the backlight is controlled by the liquid crystal panel. Linear tubular white fluorescent lamps with a fluorescent material inside thereof are generally used as the backlight.

Details of these technologies can be seen, for example, in Japanese Patent Laid-Open No. 2003-132803, No. 2003-142004, No. 2003-242892 and No. 2003-346660; "Phosphor Handbook" (in Japanese) edited by Phosphor Research Society (in The Electrochemical Society of Japan), III, Chapter 2, pp. 219–223, (1987), Ohmsha, Ltd.; IDW '00 Proceedings of The Seventh International Display Workshops, pp. 639–642 (2000); technical report of IEICE, EID 2003–69(2004-01), pp. 45–48; and "FLAT-PANEL DISPLAY 2003 (Jitsumu-hen)" (in Japanese), Part 7.1, 210–217, (2002), Nikkei Business Publications, Inc.

Light emitting devices for such plasma display devices and FED devices, and backlights for liquid crystal display devices should have higher and higher performance. The properties of these devices are affected by the designs, configurations and materials for the devices and are significantly affected by phosphors for use in the light emitting devices.

Red-, blue- and green-emitting phosphors are used as the phosphors for plasma display devices, of which blue-emitting phosphors generally contain an aluminate phosphor ($BaMgAl_{10}O_{17}$:Eu; hereinafter briefly referred to as BAM). BAM exhibits good properties in its light emission but is susceptible to deterioration. Namely, BAM exhibits insufficient reliability, has a short life and thereby must have improved stability and a longer life. It must also have a high color purity and a higher photoluminescent brightness for higher performance of light emitting devices and display devices.

The lamps and backlights for liquid crystal display devices should be free from mercury for higher luminance on display surface and for reducing environmental burdens. As a possible candidate, flat-panel fluorescent lamps using rare gas discharge have been developed as the backlights for liquid crystal display devices. Such flat-panel fluorescent lamps using rare gas discharge generally use phosphors capable of being excited upon irradiation with vacuum ultraviolet light to thereby emit light. These phosphors must efficiently emit light with high luminance and color purity as a result of excitation by vacuum ultraviolet light and have a long life.

Blue-emitting phosphors with high luminance, color purity and reliability have been developed as an alternative to BAM. For example, silicate phosphors, such as $Ca_{1-x}MgSi_2O_6:Eu_x$ (hereinafter referred to as CMS), have been proposed as a blue-emitting phosphor that can be used in PDP devices and rare gas discharge lamps and have higher reliability and longer life than the conventional blue-emitting phosphor, BAM.

Although emitting light with high luminance and satisfactory color purity upon application of ultraviolet light at wavelengths of around 147 nm as an excitation source, CMS has substantially no excitation band at wavelengths of 160 nm to 210 nm, namely, shows a significantly low emission intensity upon excitation by vacuum ultraviolet light at around 172 nm ($Xe_2$ molecular line). The $Xe_2$ molecular line plays an important role in plasma display panels.

In addition to the above, the configurations of panels in plasma display devices have been investigated and improved for high emission efficiency thereof. For example, a "high Xe-content" technology in plasma display devices has been developed, in which the mole fraction of Xe gas in a discharge gas is increased to about 4% or more to thereby positively use the $Xe_2$ molecular line and to increase the emission efficiency of the plasma display devices.

CMS originally having a low availability of the $Xe_2$ molecular line, however, does not sufficiently contribute to higher efficiency of the plasma display devices. More specifically, CMS shows a low emission efficiency upon excitation by ultraviolet light at 172 nm and shows insufficient properties in its luminance, even if the amount of ultraviolet light at wavelengths of around 172 nm. For use as an alternative to BAM and for higher efficiency of plasma display devices, CMS must be further improved in its emission efficiency upon excitation by ultraviolet light at 172 nm.

Accordingly, an object of the present invention is to improve the life of a phosphor, typically a blue-emitting phosphor, which is for use in excitation by vacuum ultraviolet light typically in plasma display devices. Another object of the present invention is to provide a light emitting device which has a sufficiently long life (duration during which the light emitting device can be used in general manner) and sufficient luminance properties using the phosphor. Yet another object of the present invention is to provide an image display device which has a sufficiently long life (duration during which the light emitting device can be used in a regular manner) and sufficient luminance properties and exhibits satisfactory performance typically in color purity using the light emitting device.

Another object of the present invention is to improve the luminance properties of a silicate phosphor, as a possible solution to conventional problems in blue-emitting phosphors, typically upon excitation by the Xe$_2$ molecular line at a wavelength of 172 nm. Yet another object of the present invention is to improve luminance properties of a conventional light emitting device and a conventional display device using the light emitting device, and a next-generation light emitting device, such as a plasma display device, which actively uses excitation by the Xe$_2$ molecular line at 172 nm and a plasma display panel image display device using the plasma display device.

SUMMARY OF THE INVENTION

Specifically, the present invention provides, in an aspect, a light emitting device including at least one pair of electrodes, a discharge gas for emitting ultraviolet light as a result of discharge upon application of a voltage between the at least one pair of electrodes, and at least one phosphor layer for emitting light as a result of excitation by the ultraviolet light emitted by the discharge gas. In the device, the discharge gas contains xenon (Xe) gas in a mole fraction of 6 percent or more, preferably 10 percent or more, and the phosphor layer contains, as a phosphor component thereof, at least an Eu-activated silicate phosphor capable of being excited by vacuum ultraviolet light to thereby emit light and represented by following Formula (I) The vacuum ultraviolet light includes at least a component at 172 nm and is emitted as a result of discharge of the xenon gas. In another aspect, the present invention provides an image display device including the light emitting device and having a plasma display panel structure.

$$M1_{3a-e}Mg_bSi_{2c}O_{8d}:Eu_e \quad (I)$$

In Formula (I), M1 is at least one element selected from the group consisting of strontium (Sr), calcium (Ca) and barium (Ba); and a, b, c, d and e are mole fractions and satisfy the following conditions: $0.8 \leq a \leq 1.2$, $0.8 \leq b \leq 1.2$, $0.8 \leq c \leq 1.2$, $0.8 \leq d \leq 1.2$, and $0.001 \leq e \leq 0.2$.

Typically preferably, the phosphor contains the Eu-activated silicate phosphor represented by Formula (I), wherein a, b, c and d are each 1.

In the europium (Eu)-activated silicate phosphor for use herein, the mole fraction e of the activator europium (Eu) in Formula (I) more preferably satisfies the following condition: $0.01 \leq e \leq 0.05$.

The mole fraction b of magnesium (Mg) in Formula (I) more preferably satisfies the following condition: $1 < b \leq 1.2$.

The mole fraction c of silicon (Si) in Formula (I) more preferably satisfies the following condition: $1 < c \leq 1.2$.

The present invention further provides, in yet another aspect, a light emitting device including a phosphor, in which the phosphor contains an Eu-activated silicate phosphor represented by following Formula (II):

$$(Sr_{1-x}M2_x)_{3a-e}Mg_bSi_{2c}O_{8d}:Eu_e \quad (II)$$

wherein M2 is at least one element selected from the group consisting of barium (Ba), calcium (Ca), zinc (Zn), manganese (Mn), titanium (Ti), vanadium (V), cobalt (Co), palladium (Pd), platinum (Pt), nickel (Ni), scandium (Sc), yttrium (Y), lanthanum (La), cerium (Ce), praseodymium (Pr), neodymium (Nd), promethium (Pm), samarium (Sm), gadolinium (Gd), terbium (Tb), dysprosium (Dy), holmium (Ho), erbium (Er), thulium (Tm), ytterbium (Yb), antimony (Sb), thallium (Tl) and lutetium (Lu); and a, b, c, d, e and x are mole fractions and satisfy the following conditions: $0.8 \leq a \leq 1.2$, $0.8 \leq b \leq 1.2$, $0.8 \leq c \leq 1.2$, $0.8 \leq d \leq 1.2$, $0.001 \leq e \leq 0.2$, and $0 < x \leq 0.5$, provided that, when M2 is Ba, x satisfies the following condition: $0.1 < x \leq 0.5$, and more preferably satisfies the following condition: $0.1 < x < 0.2$ or $0.2 < x \leq 0.5$.

The phosphor preferably includes an Eu-activated silicate phosphor represented by Formula (II) wherein a, b, c and d are each 1.

The present invention further provides, in another aspect, a light emitting device including a phosphor, in which the phosphor contains an Eu-activated silicate phosphor represented by following Formula (III):

$$(Sr_{1-x-y}Ba_xM3_y)_{3a-e}Mg_bSi_{2c}O_{8d}:Eu_e \quad (III)$$

wherein M3 is at least one element selected from the group consisting of calcium (Ca), zinc (Zn), manganese (Mn), titanium (Ti), vanadium (V), cobalt (Co), palladium (Pd), platinum (Pt), nickel (Ni), scandium (Sc), yttrium (Y), lanthanum (La), cerium (Ce), praseodymium (Pr), neodymium (Nd), promethium (Pm), samarium (Sm), gadolinium (Gd), terbium (Tb), dysprosium (Dy), holmium (Ho), erbium (Er), thulium (Tm), ytterbium (Yb), antimony (Sb), thallium (Tl) and lutetium (Lu); a, b, c, d and e are mole fractions and satisfy the following conditions: $0.8 \leq a \leq 1.2$, $0.8 \leq b \leq 1.2$, $0.8 \leq c \leq 1.2$, $0.8 \leq d \leq 1.2$, $0.001 \leq e \leq 0.2$; and x and y are mole fractions of barium (Ba) and the element M3, respectively, and satisfy the following condition: $0.1 < x + y \leq 0.5$ The phosphor preferably includes an Eu-activated silicate phosphor represented by Formula (III) wherein a, b, c and d are each 1.

The present invention further provides, in another aspect, a light emitting device including a phosphor, in which the phosphor contains an Eu-activated silicate phosphor represented by following Formula (IV):

$$(Sr_{1-x-y}Ca_xM4_y)_{3a-e}Mg_bSi_{2c}O_{8d}:Eu_e \quad (IV)$$

wherein M4 is at least one element selected from the group consisting of barium (Ba), zinc (Zn), manganese (Mn), titanium (Ti), vanadium (V), cobalt (Co), palladium (Pd), platinum (Pt), nickel (Ni), scandium (Sc), yttrium (Y), lanthanum (La), cerium (Ce), praseodymium (Pr), neodymium (Nd), promethium (Pm), samarium (Sm), gadolinium (Gd), terbium (Tb), dysprosium (Dy), holmium (Ho), erbium (Er), thulium (Tm), ytterbium (Yb), antimony (Sb), thallium (Tl) and lutetium (Lu); a, b, c, d and e are mole fractions and satisfy the following conditions: $0.8 \leq a \leq 1.2$, $0.8 \leq b \leq 1.2$, $0.8 \leq c \leq 1.2$, $0.8 \leq d \leq 1.2$ and $0.001 \leq e \leq 0.2$; and x and y are mole fractions of calcium (Ca) and the element M4, respectively, and satisfy the following condition: $0 < x + y \leq 0.2$.

The phosphor preferably includes an Eu-activated silicate phosphor represented by Formula (IV) wherein a, b, c and d are each 1.

The light emitting devices according to the present invention use the high-luminance Eu-activated silicate phosphors capable of efficiently emitting light upon excitation not only by light at a wavelength of 147 nm but also by light at a wavelength of 172 nm and thereby exhibit high luminance.

The light emitting devices according to the present invention use the Eu-activated silicate phosphors capable of efficiently emitting light with high color purity upon excitation not only by light at a wavelength of 147 nm but also by light at a wavelength of 172 nm and can thereby emit light satisfactorily.

The display devices according to the present invention include light emitting devices using the high-luminance Eu-activated silicate phosphor and/or high-color-purity Eu-activated silicate phosphor and can thereby produce a display with high luminance and/or a display with high color purity.

DESCRIPTION OF THE PREFERRED EMBODIMENTS

The conventional blue-emitting phosphor BAM has insufficient reliability and a short life and invites a decreased reliability of light emitting devices using BAM and, in turn, of display devices using the light emitting devices. As a possible solution to this problem, silicate phosphors having high reliability, such as CMS, have been proposed, but they have insufficient brightness properties upon excitation at wavelengths longer than 170 nm and do not contribute to provide high-luminance light emitting devices such as plasma display devices.

The present inventors have focused attention on silicate phosphors, have research and synthesized novel materials, have achieved silicate phosphors that can yield high luminance upon excitation by light at a wavelength of 172 nm, and thereby have achieved high-luminance light emitting devices using the silicate phosphors, and, in turn, display devices that can produce a display with high luminance using the light emitting devices.

The novel europium (Eu)-activated silicate phosphors are Eu-activated silicate phosphors represented by following Formula (I) and typically an Eu-activated silicate phosphor represented by following Formula (V). Hereinafter, Eu-activated silicate phosphors comprising strontium (Sr) and magnesium (Mg) as constitutional elements, such as Eu-activated silicate phosphors represented by Formulae (V), (II), (III), (IV), (VII), (IX), (XI), (XII) and (XIII), are generically referred to as "SMS".

$M1_{3a-e}Mg_bSi_{2c}O_{8d}$:$Eu_e$     (I)

In Formula (I), M1 is at least one element selected from the group consisting of strontium (Sr), calcium (Ca) and barium (Ba); and a, b, c, d and e are mole fractions and satisfy the following conditions: $0.8 \leq a \leq 1.2$, $0.8 \leq b \leq 1.2$, $0.8 \leq c \leq 1.2$, $0.8 \leq d \leq 1.2$, and $0.001 \leq e \leq 0.2$.

$Sr_{3a-e}Mg_bSi_{2c}O_{8d}$:$Eu_e$     (V)

In Formula (V), a, b, c, d and e are mole fractions and satisfy the following conditions: $0.8 \leq a \leq 1.2$, $0.8 \leq b \leq 1.2$, $0.8 \leq c \leq 1.2$, $0.8 \leq d \leq 1.2$, and $0.001 \leq e \leq 0.2$.

The Eu-activated silicate phosphors of Formula (I) and SMSs preferably have a composition of $M1_{3-e}MgSi_2O_8$:$Eu_e$ or $Sr_{3-e}MgSi_2O_8$:$Eu_e$, wherein a, b, c and d are each 1, according to the stoichiometry.

Silicate phosphors, however, having a composition somewhat shifted from the stoichiometric composition as shown in Formulae (I) and (V) can also be used in the present invention. For example, the mole fractions of the total of Sr, Ca and Ba, of Mg, of silicon (Si) and of oxygen (O) can be shifted to 1.2 times or less, or to 0.8 times or more those of the stoichiometric composition.

Certain phosphors having a composition somewhat shifted from the stoichiometric composition may achieve high emission properties and can be positively used, as described below.

The phosphors for use in the present invention will be illustrated below by taking a $Sr_{2.98}MgSi_2O_8$:$Eu_{0.02}$ phosphor as an example, while the preparation of such phosphors and other details will be described in the after-mentioned examples.

Figure 1:
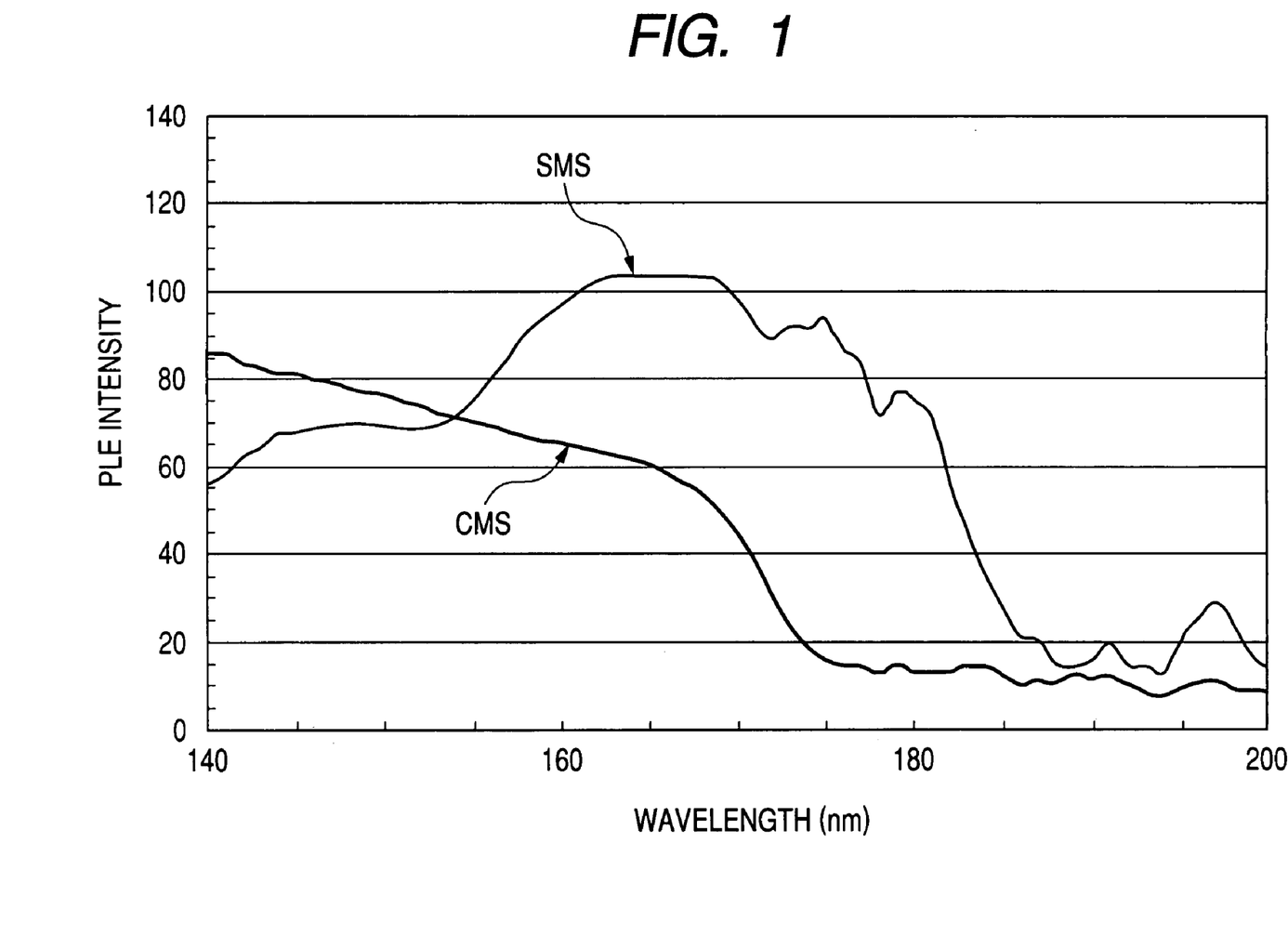
FIG. 1 shows photoluminescent excitation spectra of a phosphor SMX ($Sr_{2.98}MgSi_2O_8$:$Eu_{0.02}$) for constituting a first embodiment of the present invention and of CMS as a comparative sample.

FIG. 1 shows photoluminescent excitation spectra of an SMS, $Sr_{2.98}MgSi_2O_8$:$Eu_{0.02}$, constituting the light emitting device of the present invention, and of CMS.

The photoluminescent excitation spectra were determined according to a conventional procedure using a deuterium lamp. FIG. 1 shows that CMS has a significantly decreased PLE intensity at wavelengths exceeding about 170 nm in the photoluminescent excitation spectrum, indicating that CMS exhibits a significantly decreased emission efficiency as a result of excitation by light at a wavelength of 172 nm.

In contrast, the SMS according to the present invention shows a high PLE intensity much higher than that of CMS even at wavelengths around 170 nm, indicating that the SMS can yield a high emission efficiency as a result of excitation by light at a wavelength around 172 nm. In addition, SMS shows a high photoluminescent brightness equivalent to that of CMS even at wavelengths around 147 nm.

High-luminance light emitting devices and, in turn, high-performance display devices can be obtained by using SMS in light emitting devices such as tubular or flat-panel fluorescent lamps and plasma display panels.

Investigations on the relationship between the composition of a discharge gas and the intensity of the resulting ultraviolet light by the action of discharge have revealed that the intensity of vacuum ultraviolet light emitted by discharge increases with an increasing mole fraction of the Xe component contained in the discharge gas, and proportions of constitutional components in the resulting vacuum ultraviolet light vary with a varying mole fraction of Xe gas in the discharge gas.

More specifically, the ratio ($I_{172}/I_{147}$) of the intensity of an ultraviolet light component at 172 nm ($Xe_2$ molecular line) to that of an ultraviolet light component at 147 nm varies with a varying mole fraction of Xe gas in the discharge gas. Namely, the ratio $I_{172}/I_{147}$ increases with an increasing mole fraction of Xe gas.

The conventional plasma display devices uses a discharge gas having a mole fraction of Xe of about 1% to about 4%. In AC type plasma display devices, the ratio $I_{172}/I_{147}$ (4%) is 1.2 at a mole fraction of Xe of 4%. Accordingly, the intensity of the ultraviolet light component at 172 nm is somewhat larger than, equal to, or somewhat smaller than that of the ultraviolet light component at 147 nm contained in vacuum ultraviolet light emitted as a result of discharge in such conventional devices.

As a result of further investigations, the present inventors have found that the intensity of vacuum ultraviolet light emitted as a result of discharge increases, and the ratio $I_{172}/I_{147}$ significantly increases, with an increasing mole fraction of Xe. For example, the ratio $I_{172}/I_{147}$ significantly increases to 1.9, 3.1 and 3.8 at a mole fraction of Xe of 6%, 10% and 12%, respectively.

Accordingly, for use in high Xe-content PDP designs using a discharge gas having a mole fraction of Xe larger than that in conventional or regular plasma display devices, for example, 6%, the phosphor is preferably one capable of efficiently being excited to emit light upon irradiation of vacuum ultraviolet light at 172 nm. Demands on such phosphors increase when the devices use a discharge gas having a mole fraction of Xe of 10% or more.

The Eu-activated silicate phosphors of Formula (I), typically SMSs, are preferably used in plasma display panels using a discharge gas containing Xe gas so as to emit light highly efficiently by excitation of light at 172 nm. The resulting plasma display panels can highly efficiently utilize the $Xe_2$ molecular line and thereby provide high-luminance plasma display devices.

The Eu-activated silicate phosphors of Formula (I), typically SMSs, can be suitably applied to "high Xe-content PDP designs" using a discharge gas containing xenon (Xe) gas in a mole fraction of 6% or more, and preferably 10% or more for efficient utilization of the $Xe_2$ molecular line. This enables plasma display panels using a high Xe-content discharge gas and having a higher brightness than those using CMS. In this connection, at a mole fraction of Xe of 10% or more, the ratio $I_{172}/I_{147}$ is high, namely, the $Xe_2$ molecular line can be positively efficiently utilized.

In addition, the present inventors have found that the photoluminescent brightness and color purity in light emission of phosphors upon excitation of light at 172 nm can be increased by optimizing or improving the compositions of the Eu-activated silicate phosphors of Formula (I), typically of SMSs.

More specifically, the present inventors have synthetically prepared Eu-activated silicate phosphors represented by following Formulae (VI) and (VII) by optimizing the mole fraction of Eu. The resulting Eu-activated silicate phosphors can yield a higher brightness upon excitation by light at 172 nm and serve to provide high-luminance light emitting devices, and, in turn, display devices capable of producing a display with high luminance using these phosphors.

$$M1_{3a-e}Mg_bSi_{2c}O_{8d}:Eu_e \qquad (VI)$$

In Formula (VI), M1 is at least one element selected from the group consisting of Sr, Ca and Ba; and a, b, c, d and e are mole fractions and satisfy the following conditions: $0.8 \leq a \leq 1.2$, $0.8 \leq b \leq 1.2$, $0.8 \leq c \leq 1.2$, $0.8 \leq d \leq 1.2$, and $0.01 \leq e \leq 0.05$.

$$Sr_{3a-e}Mg_bSi_{2c}O_{8d}:Eu_e \qquad (VII)$$

In Formula (VII), a, b, c, d and e are mole fractions and satisfy the following conditions: $0.8 \leq a \leq 1.2$, $0.8 \leq b \leq 1.2$, $0.8 \leq c \leq 1.2$, $0.8 \leq d \leq 1.2$, and $0.01 \leq e \leq 0.05$ The present inventors have also synthetically prepared Eu-activated silicate phosphors represented by following Formulae (VIII) and (IX) by optimizing the mole fraction of Mg. The resulting Eu-activated silicate phosphors can yield a higher brightness upon excitation by light at 172 nm and serve to provide high-luminance light emitting devices, and, in turn, display devices capable of producing a display with high luminance using these phosphors.

$$M1_{3a-e}Mg_bSi_{2c}O_{8d}:Eu_e \qquad (VIII)$$

In Formula (VIII), M1 is at least one element selected from the group consisting of Sr, Ca and Ba; and a, b, c, d and e are mole fractions and satisfy the following conditions: $0.8 \leq a \leq 1.2$, $1 \leq b \leq 1.2$, $0.8 \leq c \leq 1.2$, $0.8 \leq d \leq 1.2$, and $0.01 \leq e \leq 0.2$.

$$Sr_{3a-e}Mg_bSi_{2c}O_{8d}:Eu_e \qquad (IX)$$

In Formula (IX), a, b, c, d and e are mole fractions and satisfy the following conditions: $0.8 \leq a \leq 1.2$, $1 < b \leq 1.2$, $0.8 \leq c \leq 1.2$, $0.8 \leq d \leq 1.2$, and $0.001 \leq e \leq 0.2$.

In addition, the present inventors have synthetically prepared Eu-activated silicate phosphors represented by following Formulae (X) and (XI) by optimizing the mole fraction of Si. The resulting Eu-activated silicate phosphors can yield a higher brightness upon excitation by light at 172 nm and serve to provide high-luminance light emitting devices, and, in turn, display devices capable of producing a display with high luminance using these phosphors.

$$M1_{3a-e}Mg_bSi_{2c}O_{8d}:Eu_e \qquad (X)$$

In Formula (X), M1 is at least one element selected from the group consisting of Sr, Ca and Ba; and a, b, c, d and e are mole fractions and satisfy the following conditions: $0.8 \leq a \leq 1.2$, $0.8 \leq b \leq 1.2$, $1 \leq c \leq 1.2$, $0.8 \leq d \leq 1.2$, and $0.001 \leq e \leq 0.2$.

$$Sr_{3a-e}Mg_bSi_{2c}O_{8d}:Eu_e \qquad (XI)$$

In Formula (XI), a, b, c, d and e are mole fractions and satisfy the following conditions: $0.8 \leq a \leq 1.2$, $0.8 \leq b \leq 1.2$, $1 < c \leq 1.2$, $0.8 \leq d \leq 1.2$, and $0.001 \leq e \leq 0.2$ Next, the present inventors have synthetically prepared an Eu-activated silicate phosphor represented by following Formula (II) for further improving the composition.

The compositional element M2 in Formula (II) can be selected from metal elements that can be substituted with or can form a solid solution with Sr and can form crystals or solid solutions with less defect. M2 is more preferably at least one element selected from divalent metal atoms and rare earth elements such as Ba, Ca, Zn, Mn, Ti, V, Co, Pd, Pt, Ni, Sc, Y, La, Ce, Pr, Nd, Pm, Sm, Gd, Tb, Dy, Ho, Er, Tm, Yb, Sb, Tl and Lu.

In these silicate phosphors, Ba is preferably used for higher color purity of light emitted as a result of excitation and for higher brightness of light emitted as a result of excitation at 172 nm. More specifically, Eu-activated silicate phosphors represented by following Formulae (XII) and (III) containing Ba are preferred.

$$(Sr_{1-x}M2_x)_{3a-e}Mg_bSi_{2c}O_{8d}:Eu_e \quad (II)$$

In Formula (II), a, b, c, d, e and x are mole fractions and satisfy the following conditions: $0.8 \leq a \leq 1.2$, $0.8 \leq b \leq 1.2$, $0.8 \leq c \leq 1.2$, $0.8 \leq d \leq 1.2$, $0.001 \leq e \leq 0.2$, and $0 < x \leq 0.5$, provided that x satisfies the following condition: $0.1 < x \leq 0.5$ when M2 is Ba.

$$(Sr_{1-x}Ba_x)_{3a-e}Mg_bSi_{2c}O_{8d}:Eu_e \quad (XII)$$

In Formula (XII), M2 is at least one element selected from the group consisting of Ba, Ca, Zn, Mn, Ti, V, Co, Pd, Pt, Ni, Sc, Y, La, Ce, Pr, Nd, Pm, Sm, Gd, Tb, Dy, Ho, Er, Tm, Yb, Sb, Tl and Lu; and a, b, c, d, e and x are mole fractions and satisfy the following conditions: $0.8 \leq a \leq 1.2$, $0.8 \leq b \leq 1.2$, $0.8 \leq c \leq 1.2$, $0.8 \leq d \leq 1.2$, $0.001 \leq e \leq 0.2$, and $0.1 \leq x \leq 0.5$.

$$(Sr_{1-x-y}Ba_xM3_y)_{3a-e}Mg_bSi_{2c}O_{8d}:Eu_e \quad (III)$$

In Formula (III), M3 is at least one element selected from the group consisting of Ca, Zn, Mn, Ti, V, Co, Pd, Pt, Ni, Sc, Y, La, Ce, Pr, Nd, Pm, Sm, Gd, Tb, Dy, Ho, Er, Tm, Yb, Sb, Tl and Lu; and a, b, c, d, e, x and y are mole fractions and satisfy the following conditions: $0.8 \leq a \leq 1.2$, $0.8 \leq b \leq 1.2$, $0.8 \leq c \leq 1.2$, $0.8 \leq d \leq 1.2$, $0.001 \leq e \leq 0.2$, and $0.1 < x+y \leq 0.5$.

According to the stoichiometry, the Eu-activated silicate phosphors of Formulae (II), (XII) and (III) have compositions of $(Sr_{1-x}M2_x)_{3a-e}MgSi_2O_8:Eu_e$, $(Sr_{1-x}Ba_x)_{3a-e}MgSi_2O_8:Eu_e$, and $(Sr_{1-x-y}Ba_xM3_y)_{3a-e}MgSi_2O_8:Eu_e$, respectively.

Silicate phosphors, however, having a composition somewhat shifted from the stoichiometric composition as shown in Formulae (II), (XII) and (III) can also be used in the present invention. For example, the mole fractions of the total of Sr and M2, the total of Sr and Ba, the total of Sr, Ba and M3, of Mg, of silicon (Si) and of oxygen (O) can be shifted to 1.2 times or less, or to 0.8 times or more those of the stoichiometric composition.

The resulting silicate phosphors can emit light with higher luminance and high color purity upon excitation by light at 172 nm, which in turn enable high-luminance light emitting devices and display devices capable of producing a display with high performance.

In these silicate phosphors, Ca is preferably used for higher brightness of light emitted as a result of excitation by ultraviolet light at 172 nm. More specifically, Eu-activated silicate phosphors represented by following Formulae (XIII) and (IV) containing Ca are preferred.

$$(Sr_{1-x}Ca_x)_{3a-e}Mg_bSi_{2c}O_{8d}:Eu_e \quad (XIII)$$

In Formula (XIII), a, b, c, d, e and x are mole fractions and satisfy the following conditions: $0.8 \leq a \leq 1.2$, $0.8 \leq b \leq 1.2$, $0.8 \leq c \leq 1.2$, $0.8 \leq d \leq 1.2$, $0.001 \leq e \leq 0.2$, and $0 < x \leq 0.2$.

$$(Sr_{1-x-y}Ca_xM4_y)_{3a-e}Mg_bSi_{2c}O_{8d}:Eu_e \quad (IV)$$

In Formula (IV), M4 is at least one element selected from the group consisting of Ba, Zn, Mn, Ti, V, Co, Pd, Pt, Ni, Sc, Y, La, Ce, Pr, Nd, Pm, Sm, Gd, Tb, Dy, Ho, Er, Tm, Yb, Sb, Tl and Lu; and a, b, c, d, e, x and y are mole fractions and satisfy the following conditions: $0.8 \leq a \leq 1.2$, $0.8 \leq b \leq 1.2$, $0.8 \leq c \leq 1.2$, $0.8 \leq d \leq 1.2$, $0.001 \leq e \leq 0.2$, and $0 < x+y \leq 0.2$.

According to the stoichiometry, the Eu-activated silicate phosphors of Formulae (XIII) and (IV) have compositions of $(Sr_{1-x}Ca_x)_{3a-e}MgSi_2O_8:Eu_e$ and $Sr_{1-x-y}Ca_xM4_y)_{3a-e}MgSi_2O_8:Eu_e$, respectively.

Silicate phosphors, however, having a composition somewhat shifted from the stoichiometric composition as shown in Formulae (XIII) and (IV) can also be used in the present invention. For example, the mole fractions of the total of Sr and Ca, the total of Sr, Ca and M4, of Mg, of silicon (Si) and of oxygen (O) can be shifted to 1.2 times or less, or to 0.8 times or more those of the stoichiometric composition.

These Eu-activated silicate phosphors enable high-luminance light emitting devices and display devices capable of producing a display with high brightness.

A plasma display panel as an embodiment of the present invention using the Eu-activated silicate phosphors, typically SMS, can be configured as follows.

Figure 2:
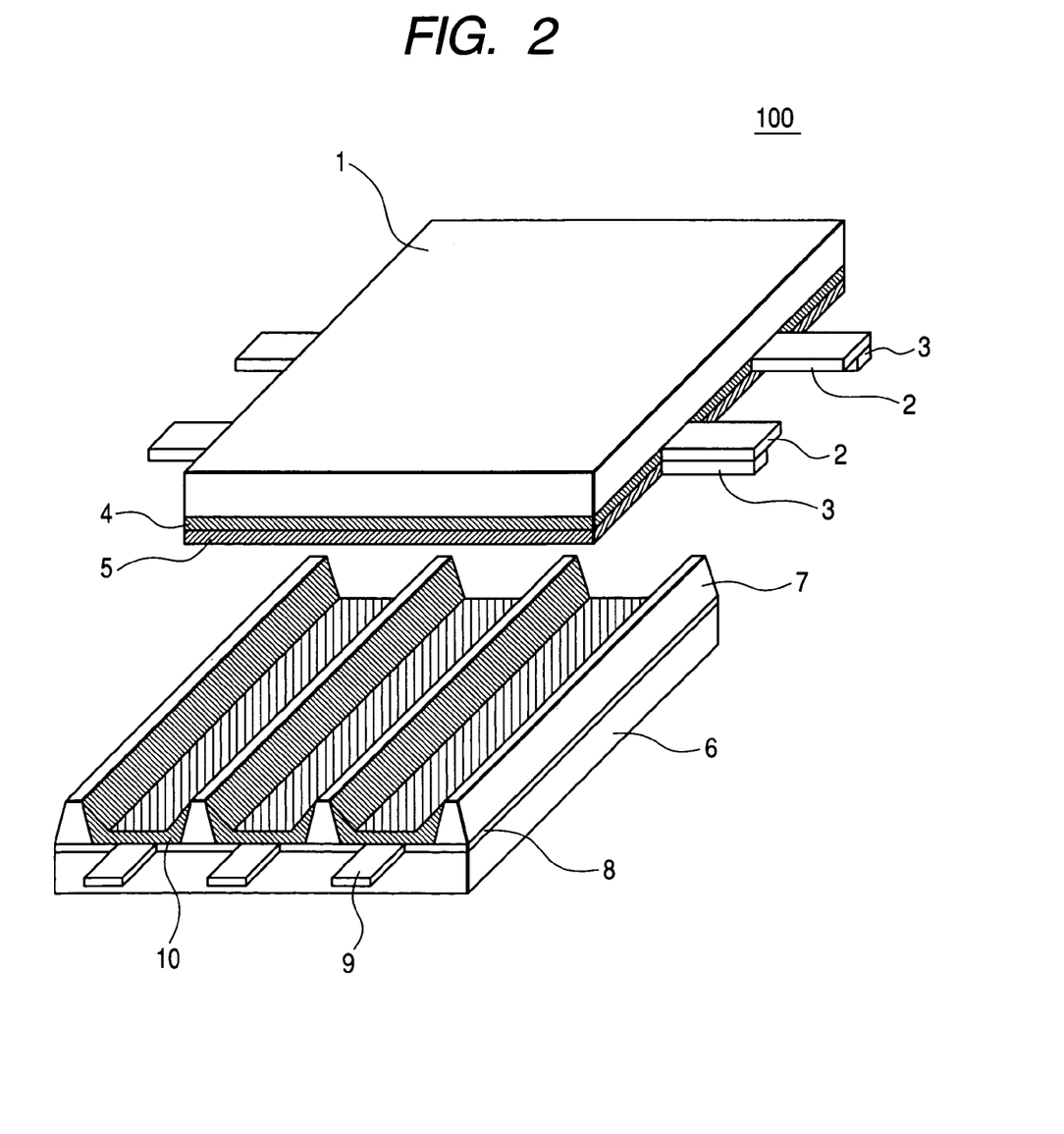
FIG. 2 is an exploded perspective view of a configuration of a plasma display panel (PDP) as an embodiment of the present invention.

FIG. 2 is an exploded perspective view of a configuration of a plasma display panel (PDP) as an embodiment of the present invention.

A plasma display panel 100 as an embodiment of the present invention has a structure corresponding to "surface discharge" and includes a pair of substrates 1 and 6, barrier ribs 7, a discharge gas (not shown), display electrodes 2 and address electrodes 9. The pair of substrates 6 and 7 is arranged at a distance so as to face each other. The barrier ribs 7 are arranged between the pair of substrates 6 and 7 so as to keep the distance between the two substrates. The discharge gas is sealed in a space between the pair of substrates 6 and 7 and serves to emit ultraviolet light as a result of discharge. The display electrodes 2 and address electrodes 9 are arranged on facing sides of the pair of substrates 6 and 7, respectively. The plasma display panel 100 further comprises a phosphor layer 10 containing a phosphor including the Eu-activated silicate phosphor on one of the pair of substrates, namely on the substrate 6, and on or above a surface of the barrier ribs 7. Upon discharge, the discharge gas emits ultraviolet light, and the ultraviolet light excites the Eu-activated silicate phosphor constituting the phosphor layer 10 to thereby emit light.

FIG. 2 also illustrates bus-lines 3, dielectric layers 4 and 8, and a protective film 5 for protecting the electrodes. The bus-lines 3 comprise silver or Cu—Cr, are integrated with the display electrodes 2 and serve to reduce the electrode resistance.

In such surface-discharge color plasma display devices as shown in the present embodiment, a negative voltage is applied to a display electrode (generally referred to as "scanning electrode") and a positive voltage (a positive voltage as compared with the voltage applied to the scanning electrode) is applied to an address electrode and another display electrode so as to allow discharge. This makes a wall charge between the scanning electrode and the display electrode, serving as an auxiliary for initiating discharge. This is referred to as "write". A suitable reverse voltage is applied to between the scanning electrode and the display electrode in this state, resulting in discharge via the dielectric and the protective layer in a discharge space between the two electrodes.

After the completion of discharge, the voltage applied to the scanning electrode and the display electrode is reversed so as to induce another discharge. Discharge occurs continuously by repeating this procedure. This is referred to as sustain discharge or display discharge.

The present invention will be illustrated in further detail with reference to several specific embodiments corresponding to preferred embodiments below, which are never intended to limit the scope of the present invention.

First Embodiment

In the present embodiment, preparation of a phosphor, preparation of a plasma display panel using the phosphor, and preparation of an image display device using the plasma display panel will be sequentially illustrated with reference to the drawings.

(1) Preparation of Phosphor

A phosphor was synthetically prepared as a constitutional member of a plasma display panel according to the first embodiment of the present invention.

The resulting phosphor has a composition of $Sr_{2.98}MgSi_2O_8:Eu_{0.02}$.

The phosphor was prepared in the following manner. Initially, 4.399 g (29.80 mmol) of $SrCO_3$, 0.962 g (10.00 mmol) of $MgCO_3$, 1.202 g (20.00 mmol) of $SiO_2$, 0.0352 g (0.10 mmol) of $Eu_2O_3$, and 0.392 g (4.00 mmol) of $NH_4Br$ as a flux were weighed, were fully mixed in an agate mortar, the resulting mixture was charged into a heat-stable vessel and was heated at 1250° C. in a reducing atmosphere for three hours.

The heated product was pulverized, was washed with water, was dried and thereby yielded the silicate phosphor having the above composition (SMS). The photoluminescent excitation spectra of the resulting phosphor (SMS) and CMS as a comparative sample were determined according to a conventional procedure using a deuterium lamp as a light source. The results are shown in FIG. 1.

FIG. 1 shows that CMS has a significantly decreased PLE intensity at wavelengths exceeding about 170 nm in the photoluminescent excitation spectrum, indicating that CMS exhibits a significantly decreased emission efficiency as a result of excitation by light at a wavelength of 172 nm.

In contrast, the SMS according to the present invention shows a high PLE intensity much higher than that of CMS even at wavelengths around 170 nm, indicating that SMS can yield a high emission efficiency as a result of excitation by light at a wavelength of around 172 nm. In addition, SMS shows a high photoluminescent brightness equivalent to that of CMS even upon excitation at wavelengths of around 147 nm.

Four SMSs having different mole fractions of Eu were prepared according to the above procedure.

The resulting four phosphors have composition formulae of $Sr_{2.995}MgSi_2O_8:Eu_{0.005}$, $Sr_{2.99}MgSi_2O_8:Eu_{0.01}$, $Sr_{2.95}MgSi_2O_8:Eu_{0.05}$, and $Sr_{2.90}MgSi_2O_8:Eu_{0.10}$, respectively.

The phosphor having a composition of $Sr_{2.995}MgSi_2O_8:Eu_{0.005}$ was prepared by the above procedure, except for using 4.421 g (29.95 mmol) of $SrCO_3$ and 0.0088 g (0.025 mmol) of $Eu_2O_3$. Likewise, the phosphor having a composition of $Sr_{2.99}MgSi_2O_8:Eu_{0.01}$ was prepared by using 4.414 g (29.90 mmol) of $SrCO_3$ and 0.0176 g (0.050 mmol) of $Eu_2O_3$. The phosphor having a composition of $Sr_{2.95}MgSi_2O_8:Eu_{0.05}$ was prepared by using 4.355 g (29.50 mmol) of $SrCO_3$ and 0.0880 g (0.25 mmol) of $Eu_2O_3$. The phosphor having a composition of $Sr_{2.90}MgSi_2O_8:Eu_{0.10}$ was prepared by using 4.281 g (29.00 mmol) of $SrCO_3$ and 0.1760 g (0.50 mmol) of $Eu_2O_3$.

The photoluminescent brightness of the prepared phosphors was determined in terms of a relative photoluminescent brightness, namely, the ratio of the photoluminescent brightness of a sample phosphor to that of CMS as a comparative sample upon excitation by vacuum ultraviolet light at 172 nm.

Figure 3:
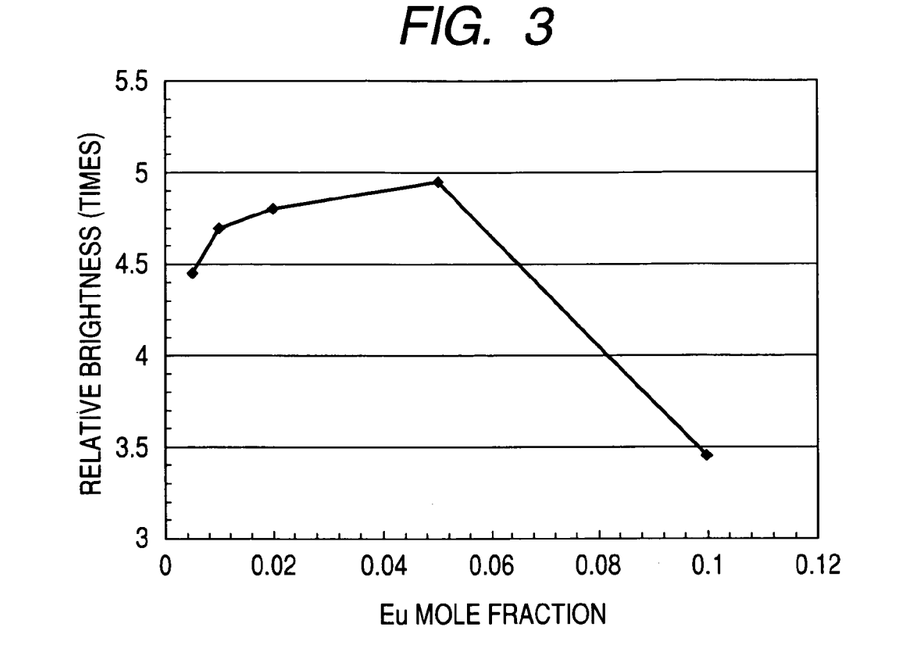
FIG. 3 is a graph showing the relationship between the mole fraction of Eu and the relative brightness in a phosphor used in the plasma display panel according to the first embodiment of the present invention.

FIG. 3 is a graph showing the relationship between the mole fraction of Eu and the relative brightness.

FIG. 3 shows that the phosphors according to the present invention have a photoluminescent brightness three times or more as high as that of CMS upon excitation at 172 nm.

FIG. 3 also shows that the brightness significantly increases at mole fractions of Eu of 0.005 to 0.01 and significantly decreases at mole fractions of Eu of 0.05 to 0.1, indicating that the preferred mole fraction of Eu is from 0.01 to 0.05 for further higher brightness.

Separately, the photoluminescent brightness of the phosphor having a composition of $Sr_{2.98}MgSi_2O_8:Eu_{0.02}$ and CMS as the comparative sample was determined upon excitation by vacuum ultraviolet light at 146 nm. As a result, the former shows a brightness 1.22 times as high as that of CMS.

These results show that SMSs can provide plasma display panels using a discharge gas containing Xe gas so as to emit light highly efficiently upon excitation by light at 146 nm and 172 nm. The resulting plasma display devices can use the $Xe_2$ molecular line highly efficiently and have high luminance.

In addition, these phosphors can be suitably applied to "high Xe-content PDP designs" using a discharge gas containing xenon (Xe) gas in a mole fraction of 6% or more, and preferably 10% or more for efficient utilization of the $Xe_2$ molecular line. This enables plasma display panels using a high Xe-content discharge gas and having a higher brightness than those using CMS.

(2) Preparation of Plasma Display Panel

A surface-discharge plasma display panel (PDP) as a light emitting device having the above configuration shown in FIG. 2 was prepared by using the silicate phosphor of $Sr_{2.98}MgSi_2O_8:Eu_{0.02}$ as a blue-emitting phosphor for constituting a blue-emitting phosphor layer.

The PDP according to the present embodiment is prepared by forming address electrodes 9 typically from silver, and a dielectric layer 8 typically from a glass material on a back substrate 6, printing a thick film of a material for barrier rib made typically from a glass material thereonto, partially removing the printed material by blasting using a blast mask to thereby form barrier ribs 7.

Red-, green- and blue-emitting phosphor layers 10 are sequentially formed in stripes on the barrier ribs 7 so as to cover a groove surface between corresponding barrier ribs, respectively.

The red-, green- and blue-emitting phosphor layers 10 are prepared in the following manner. A red-emitting phosphor paste containing 40 parts by weight of a red-emitting phosphor particle and 60 parts by weight of a vehicle; a green-emitting phosphor paste containing 35 parts by weight of a green-emitting phosphor particle and 65 parts by weight of a vehicle; and a blue-emitting phosphor paste containing 35 parts by weight of a blue-emitting phosphor particle and 65 parts by weight of a vehicle are prepared, respectively. Each of the pastes is applied to between the barrier ribs by screen printing. The printed layers are subjected to drying and heating processes to thereby evaporate volatile components and to burn off organic matters in the phosphor pastes to thereby form the phosphor layers 10. Each of the phosphor particles used in the phosphor layers 10 has a median particle diameter in particle size distribution of 3 μm.

The red-emitting phosphor is a 1:1 mixture of a (Y, Gd)$BO_3$:Eu phosphor and a $Y_2O_3$:Eu phosphor, and the green-emitting phosphor is a $Zn_2SiO_4$:Mn phosphor.

A front substrate 1 bearing display electrodes 2, bus-electrodes 3, a dielectric layer 4 and a protective layer 5 is sealed with the back substrate 6 with a frit (not shown) The inside of the panel is evacuated, a discharge gas is charged into the panel, and the panel is sealed. The discharge gas contains Xe gas in a mole fraction of 10%. The resulting PDP according to the present embodiment measures three inches in diagonal line with a pitch of one pixel of 1000 μm by 1000 μm.

Next, a plasma display device is prepared by using the above-prepared PDP including the silicate phosphor as a blue-emitting phosphor according to the first embodiment of the present invention.

(3) Image Display Device Using Plasma Display Panel

Figure 4:
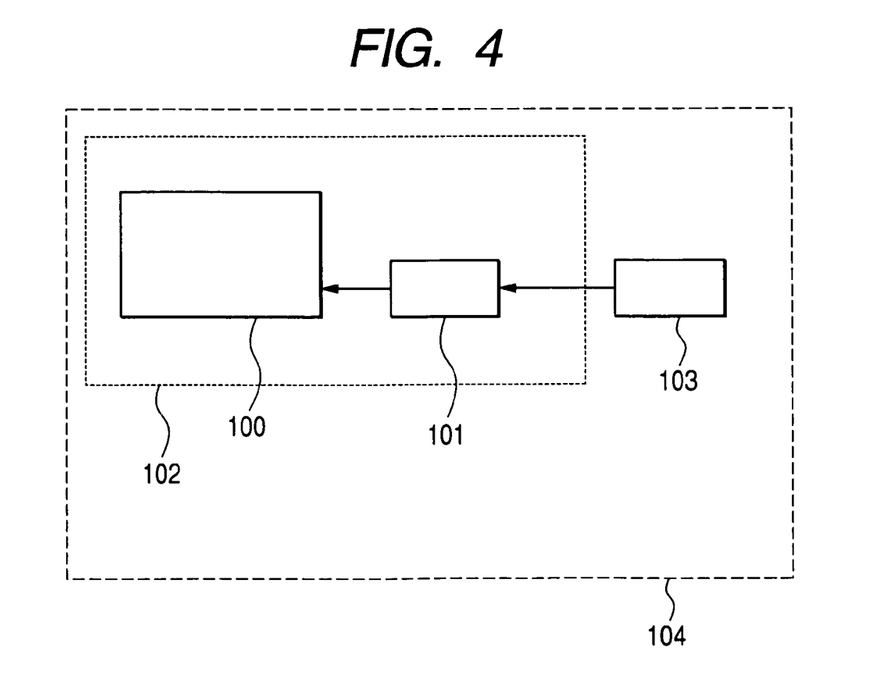
FIG. 4 is a block diagram of an image display device using the plasma display panel according to the present invention.

FIG. 4 is a block diagram of an image display system. The image display system 104 has a plasma display device using the plasma display panel (PDP) according to the first embodiment of the present invention containing, as a blue-emitting phosphor, the Eu(II)-activated silicate phosphor.

The plasma display device 102 according to the present embodiment comprises a plasma display panel 100 and a drive circuit 101 for driving the plasma display panel 100. The image display system 104 further includes an image source (image information signal) 103 in addition to the plasma display device 102. The drive circuit 101 receives image signals from the image source 103 and convert them into driving signals to drive the plasma display panel 100. The image display system 104 is thus configured.

The plasma display device 102 has a high brightness and a long life. The red- and green-emitting phosphors are not illustrated in detail in this embodiment, but the following phosphors can also be used in the preparation of PDP.

The red-emitting phosphor may include at least one selected from the group consisting of (Y, Gd)$BO_3$:Eu, (Y, Gd)$_2O_3$:Eu and (Y, Gd) (P, V)$O_4$:Eu phosphors. The green-emitting phosphor may include at least one selected from $Zn_2SiO_4$:Mn, (Y, Gd, Sc)$_2SiO_5$:Tb, (Y, Gd)$_3$(Al, Ga)$_5O_{12}$:Tb, (Y, Gd)$_3$(Al, Ga)$_5O_{12}$:Ce, (Y, Gd)$B_3O_6$:Tb and (Y, Gd)$PO_4$:Tb phosphors. In addition, any other suitable combinations of phosphors can be employed in the present invention.

Second Embodiment

Initially, a material phosphor was synthetically prepared for the preparation of a plasma display panel according to the second embodiment of the present invention.

The prepared phosphor is a silicate phosphor (SMS) having a mole fraction of Mg slightly larger than the stoichiometric mole fraction (where b is 1 in the above formulae) and has a composition formula of $Sr_{2.97}Mg_{1.01}Si_2O_8$:$Eu_{0.03}$. The actual composition formula of this phosphor is somewhat different from the composition formula just mentioned above, and the actual mole fraction typically of Sr is somewhat smaller than that in the compositional formula, since the mole fraction of Mg is larger than the stoichiometric mole fraction.

The phosphor was prepared in the following manner. Initially, 4.385 g (29.70 mmol) of $SrCO_3$, 0.972 g (10.10 mmol) of $MgCO_3$, 1.202 g (20.00 mmol) of $SiO_2$, 0.0528 g (0.15 mmol) of $Eu_2O_3$, and 0.392 g (4.00 mmol) of $NH_4Br$ as a flux were weighed, were fully mixed in an agate mortar, the resulting mixture was charged into a heat-stable vessel and was heated at 1250° C. in a reducing atmosphere for three hours.

The heated product was pulverized, was washed with water, was dried and thereby yielded the silicate phosphor having the above composition (SMS). The photoluminescent brightness of the prepared phosphor was determined in terms of a relative photoluminescent brightness, namely, the ratio of the photoluminescent brightness of the sample phosphor to that of a comparative sample upon excitation by vacuum ultraviolet light at 172 nm. The comparative sample herein is an SMS having a composition formula of $Sr_{2.97}MgSi_2O_8$:$Eu_{0.03}$, wherein the mole fraction of Mg is the stoichiometric mole fraction.

The above-prepared phosphor shows a brightness 1.16 times as high as that of the comparative sample, indicating that the former has a high brightness upon excitation at 172 nm. In addition, the phosphor according to the second embodiment was found to have a brightness higher than the five phosphors used in the first embodiment, i.e., the phosphors having composition formulae of $Sr_{2.98}MgSi_2O_8$:$Eu_{0.02}$, $Sr_{2.995}MgSi_2O_8$:$Eu_{0.005}$, $Sr_{2.99}MgSi_2O_8$:$Eu_{0.01}$, $Sr_{2.95}MgSi_2O_8$:$Eu_{0.05}$, and $Sr_{2.90}MgSi_2O_8$:$Eu_{0.10}$.

These results show that the silicate phosphor SMS having a mole fraction of Mg slightly larger than the stoichiometric mole fraction can provide plasma display panels using a discharge gas containing Xe gas so as to emit light highly efficiently upon excitation by light at 172 nm. The resulting plasma display devices can use the $Xe_2$ molecular line highly efficiently and have high luminance.

In addition, the phosphor can be suitably applied to "high Xe-content PDP designs" using a discharge gas containing xenon (Xe) gas in a mole fraction of 6% or more, and preferably 10% or more for efficient utilization of the $Xe_2$ molecular line. This enables plasma display panels using a high Xe-content discharge gas and having a higher brightness than those using CMS.

Next, a silicate phosphor (SMS) having a mole fraction of Mg slightly larger than the stoichiometric mole fraction (where b is 1 in the above formulae) was prepared. The prepared phosphor has a composition formula of $Sr_{2.97}Mg_{1.1}Si_2O_8$:$Eu_{0.03}$. The phosphor was prepared by the above procedure, except for using 1.058 g (11.0 mmol) of $MgCO_3$.

The photoluminescent brightness of the prepared phosphor was determined in terms of a relative photoluminescent brightness, namely, the ratio of the photoluminescent brightness of the sample phosphor to that of a comparative sample upon excitation by vacuum ultraviolet light at 172 nm. The comparative sample herein is an SMS having a composition formula of $Sr_{2.97}MgSi_2O_8$:$Eu_{0.03}$, wherein the mole fraction of Mg is the stoichiometricmole fraction (where b is 1 in the above formulae). The above-prepared phosphor shows a brightness 1.03 times as high as that of the comparative sample, indicating that the former has a high brightness upon excitation at 172 nm.

Next, a silicate phosphor (SMS) having a mole fraction of Mg significantly larger (1.5 times, corresponding to b=1.5 in the formulae) than the stoichiometric mole fraction was synthetically prepared. The phosphor was prepared by the above procedure, except for using 1.443 g (15.0 mmol) of $MgCO_3$. The photoluminescent brightness of the phosphor was determined by the above procedure to find that it has a brightness equivalent to that of the comparative sample.

These results show that the mole fraction of Mg is preferably slightly larger than the stoichiometric mole fraction and smaller than 1.5 times as much as the stoichiometric mole fraction for higher photoluminescent brightness of SMS upon excitation by vacuum ultraviolet light at 172 nm. Accordingly, a plasma display panel (PDP) as a light emitting device was prepared by the procedure of the first embodiment, except for using the silicate phosphor (SMS) having a mole fraction of Mg slightly larger than the stoichiometric mole fraction and having a composition formula of $Sr_{2.97}Mg_{1.01}Si_2O_8$:$Eu_{0.03}$. The resulting plasma display device has a high brightness and a long life.

Third Embodiment

Initially, a material phosphor was synthetically prepared for the preparation of a plasma display panel as the third embodiment of the present invention. The prepared phosphor is a silicate phosphor (SMS) having a mole fraction of Si larger than the stoichiometric mole fraction (where c is 1 in the above formulae) and has a composition formula of $Sr_{2.99}MgSi_{2.1}O_{8.2}:Eu_{0.01}$. The actual composition formula is somewhat different from the composition formula just mentioned above, and the actual mole fractions typically of Sr and Mg are somewhat smaller than the above composition, since the mole fraction of Si is larger than the stoichiometric mole fraction.

The phosphor was prepared in the following manner. Initially, 4.414 g (29.90 mmol) of $SrCO_3$, 0.962 g (10.00 mmol) of $MgCO_3$, 1.262 g (21.00 mmol) of $SiO_2$, 0.0176 g (0.050 mmol) of $Eu_2O_3$, and 0.392 g (4.00 mmol) of $NH_4Br$ as a flux were weighed, were fully mixed in an agate mortar, the resulting mixture was charged into a heat-stable vessel and was heated at 1250° C. in a reducing atmosphere for three hours.

The heated product was pulverized, was washed with water, was dried and thereby yielded the silicate phosphor (SMS) having the above composition. The photoluminescent brightness of the prepared phosphors was determined in terms of a relative photoluminescent brightness, namely, the ratio of the photoluminescent brightness of the sample phosphor to that of a comparative sample upon excitation by vacuum ultraviolet light at 172 nm. The comparative sample herein is an SMS having a composition formula of $Sr_{2.99}MgSi_2O_8:Eu_{0.01}$, wherein the mole fraction of Si is the stoichiometric mole fraction (where c is 1 in the above formulae).

The above-prepared phosphor shows a brightness 1.20 times as high as that of the comparative sample, indicating that the former has a high brightness upon excitation at 172 nm. These results show that the silicate phosphor SMS having a mole fraction of Si slightly larger than the stoichiometric mole fraction can provide plasma display panels using a discharge gas containing Xe gas so as to emit light highly efficiently upon excitation by light at 172 nm. The resulting plasma display devices can use the $Xe_2$ molecular line highly efficiently and have high luminance.

In addition, the phosphor can be suitably applied to "high Xe-content PDP designs" using a discharge gas containing xenon (Xe) gas in a mole fraction of 6% or more, and preferably 10% or more for efficient utilization of the $Xe_2$ molecular line. This enables plasma display panels using a high Xe-content discharge gas and having a higher brightness than those using CMS.

These results show that the mole fraction of Si is preferably slightly larger than the stoichiometric mole fraction for higher photoluminescent brightness upon excitation by vacuum ultraviolet light at 172 nm. Accordingly, a plasma display panel (PDP) as a light emitting device was prepared by the procedure of the first embodiment, except for using the silicate phosphor (SMS) having a mole fraction of Si slightly larger than the stoichiometric mole fraction and having a composition formula of $Sr_{2.99}MgSi_{2.1}O_8:Eu_{0.01}$. The resulting plasma display device has a high brightness and a long life.

Fourth Embodiment

Initially, a material phosphor was synthetically prepared for the preparation of a plasma display panel as the fourth embodiment of the present invention. The prepared phosphor has a composition formula of $(Sr_{0.9}Ba_{0.1})_{2.97}MgSi_2O_8:Eu_{0.03}$.

The phosphor was prepared in the following manner. Initially, 3.946 g (26.73 mmol) of $SrCO_3$, 0.586 g (2.97 mmol) of $BaCO_3$, 0.962 g (10.00 mmol) of $MgCO_3$, 1.202 g (20.00 mmol) of $SiO_2$, 0.0528 g (0.15 mmol) of $Eu_2O_3$, and 0.392 g (4.00 mmol) of $NH_4Br$ as a flux were weighed, were fully mixed in an agate mortar, the resulting mixture was charged into a heat-stable vessel and was heated at 1250° C. in a reducing atmosphere for three hours.

The heated product was pulverized, was washed with water, was dried and thereby yielded the silicate phosphor having the above composition (hereinafter referred to as B-SMS).

Phosphors having composition formulae of $(Sr_{0.8}Ba_{0.2})_{2.97}MgSi_2O_8:Eu_{0.03}$, $(Sr_{0.75}Ba_{0.25})_{2.97}MgSi_2O_8:Eu_{0.03}$, $(Sr_{0.7}Ba_{0.3})_{2.97}MgSi_2O_8:Eu_{0.03}$, $(Sr_{0.6}Ba_{0.4})_{2.97}MgSi_2O_8:Eu_{0.03}$ and $(Sr_{0.5}Ba_{0.5})_{2.97}MgSi_2O_8:Eu_{0.03}$ were prepared by the above procedure, except for setting the mole fraction x of Ba for substituting part of Sr at 0.2, 0.25, 0.3, 0.4 and 0.5, respectively.

The phosphor of $(Sr_{0.8}Ba_{0.2})_{2.97}MgSi_2O_8:Eu_{0.03}$ was prepared by the above procedure, except for using 3.508 g (23.76 mmol) of $SrCO_3$ and 1.172 g (5.94 mmol) of $BaCO_3$. Likewise, the phosphor of $(Sr_{0.75}Ba_{0.25})_{2.97}MgSi_2O_8:Eu_{0.03}$ was prepared by using 3.288 g (22.28 mmol) of $SrCO_3$ and 1.465 g (7.43 mmol) of $BaCO_3$. The phosphor of $(Sr_{0.7}Ba_{0.3})_{2.97}MgSi_2O_8:Eu_{0.03}$ was prepared by using 3.069 g (20.79 mmol) of $SrCO_3$ and 1.758 g (8.91 mmol) of $BaCO_3$. The phosphor of $(Sr_{0.6}Ba_{0.4})_{2.97}MgSi_2O_8:Eu_{0.03}$ was prepared by using 2.631 g (17.82 mmol) of $SrCO_3$ and 2.344 g (11.88 mmol) of $BaCO_3$. The phosphor of $(Sr_{0.5}Ba_{0.5})_{2.97}MgSi_2O_8:Eu_{0.03}$ was prepared by using 2.192 g (14.85 mmol) of $SrCO_3$ and 2.930 g (14.85 mmol) of $BaCO_3$.

The y values in xy chromaticity diagram (CIE chromaticity coordinates) of light emitted from the above-prepared phosphors and CMS as a comparative sample upon excitation by vacuum ultraviolet light at 172 nm were determined so as to determine their color purities.

As a result, CMS has a y value of 0.108. In contrast, the phosphors of $(Sr_{0.9}Ba_{0.1})_{2.97}MgSi_2O_8:Eu_{0.03}$, $(Sr_{0.8}Ba_{0.2})_{2.97}MgSi_2O_8:Eu_{0.03}$, $(Sr_{0.75}Ba_{0.25})_{2.97}MgSi_2O:Eu_{0.03}$, $(Sr_{0.7}Ba_{0.3})_{2.97}MgSi_2O_8:Eu_{0.03}$, $(Sr_{0.6}Ba_{0.4})_{2.97}MgSi_2O_8:Eu_{0.03}$ and $(Sr_{0.5}Ba_{0.5})_{2.97}MgSi_2O_8:Eu_{0.03}$ have y values of 0.0862, 0.0702, 0.0566, 0.0448, 0.0311 and 0.0279, respectively.

The photoluminescent brightness of the prepared phosphors was determined in terms of a relative photoluminescent brightness, namely, the ratio of the photoluminescent brightness of the sample phosphor to that of CMS as a comparative sample upon excitation by vacuum ultraviolet light at 172 nm.

Figure 5:
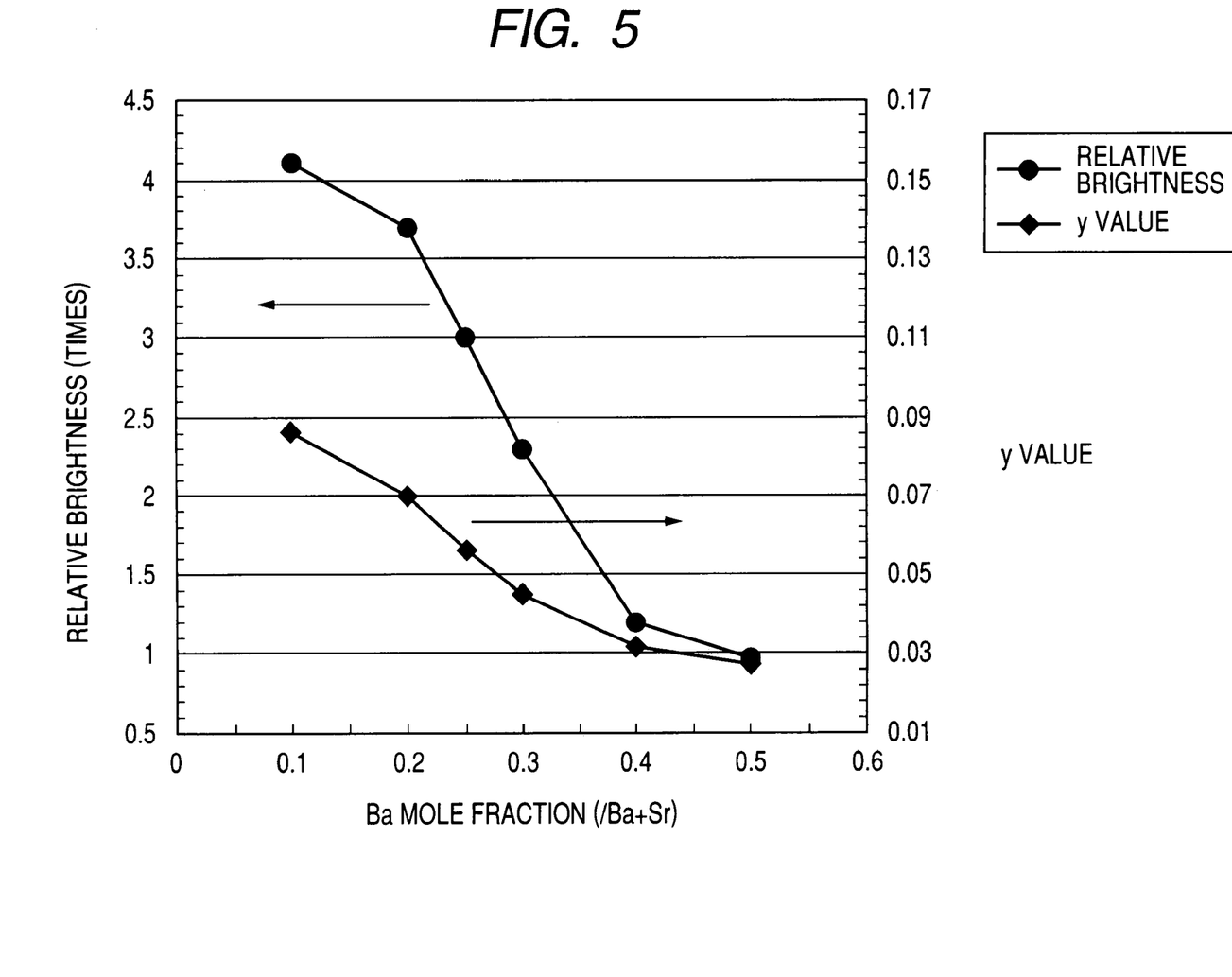
FIG. 5 is a graph showing the relationship among the mole fraction of Ba, the relative brightness and the y value in a phosphor constituting the plasma display panel according to a fourth embodiment of the present invention.

FIG. 5 is a graph showing the relationship among the mole fraction of Ba, the relative brightness and the y value. FIG. 5 shows that the phosphors of $(Sr_{0.9}Ba_{0.1})_{2.97}MgSi_2O_8:Eu_{0.03}$, $(Sr_{0.8}Ba_{0.2})_{2.97}MgSi_2O_8:Eu_{0.03}$, $(Sr_{0.75}Ba_{0.25})_{2.97}MgSi_2O_8:Eu_{0.03}$, $(Sr_{0.7}Ba_{0.3})_{2.97}MgSi_2O_8:Eu_{0.03}$, $(Sr_{0.6}Ba_{0.4})_{2.97}MgSi_2O_8:Eu_{0.03}$ and $(Sr_{0.5}Ba_{0.5})_{2.97}MgSi_2O_8:Eu_{0.03}$ have brightness of 4.1 times, 3.7 times, 3.0 times, 2.29 times, 1.12 times and 1 time as high as the brightness of the comparative sample, CMS.

These results show that the above-prepared silicate phosphors (B—SMSs) have color purities higher than that of CMS, that the B—SMSs have photoluminescent brightness equal to or higher than that of CMS at a mole fraction of Ba of 50% or less of the total of Ba and Sr and have photoluminescent brightness higher than that of CMS at a mole fraction of Ba of less than 50% of the total of Ba and Sr upon excitation by vacuum ultraviolet light at 172 nm.

Accordingly, B-SMSs preferably have a mole fraction of Ba equal to or less than 50% of the mole fraction of the total of Ba and Sr and more preferably have a mole fraction of Ba less than 50% of the mole fraction of the total of Ba and Sr.

In view of brightness, the phosphors (S-SMSs) according to the present embodiment further preferably have a mole fraction of Ba of equal to or more than 10% and less than 20% of the total of Ba and Sr for further higher photoluminescent brightness upon excitation by vacuum ultraviolet light at 172 nm.

In view of color purity, the S—SMS having a mole fraction of Ba exceeding 20% of the total of Ba and Sr has a y value less than 0.07, indicating that this phosphor has both a high color purity and a high brightness. In addition, FIG. 5 shows that the S-SMS has a y value less than about 0.06 at a mole fraction of Ba equal to or more than 23% of the total of Ba and Sr, indicating that such a phosphor has a further higher color purity and further higher photoluminescent properties.

Accordingly, the mole fraction of Ba is preferably equal to or more than 10% and less than 20% of the total of Ba and Sr in view typically of brightness, and is preferably equal to or less than 50% and more than 20%, more preferably equal to or more than 23%, of the total of Ba and Sr in view typically of color purity.

For higher emission efficiency, the mole fraction of Ba is preferably 40% or less, and more preferably 30% or less of the total of Ba and Sr. This preferred range is determined according to a simple procedure by dividing the photoluminescent brightness of a sample phosphor by the y value thereof and evaluating the resulting value.

Accordingly, the mole fraction of Ba to the total of Ba and Sr is preferably equal to or more than 10% and less than 20%, or more than 20% and equal to or less than 40% for higher emission properties. It is more preferably equal to or more than 10% and less than 20%, or more than 20% and equal to or less than 30% for further higher emission properties.

Separately, the photoluminescent brightness of the phosphor having a composition of $(Sr_{0.8}Ba_{0.2})_{2.97}MgSi_2O_8:Eu_{0.03}$ and CMS as a comparative sample was determined upon excitation by vacuum ultraviolet light at 146 nm. As a result, the former shows a brightness equivalent to that of the latter.

These results show that the above-prepared silicate phosphors (B-SMSs) can provide plasma display panels using a discharge gas containing Xe gas so as to emit light highly efficiently upon excitation by light at 172 nm. The resulting plasma display devices can use the $Xe_2$ molecular line highly efficiently and have high luminance.

In addition, these phosphors can be suitably applied to "high Xe-content PDP designs" using a discharge gas containing xenon (Xe) gas in a mole fraction of 6% or more, and preferably 10% or more for efficient utilization of the $Xe_2$ molecular line. This enables plasma display panels using a high Xe-content discharge gas and having a higher brightness than those using CMS.

Next, a plasma display panel (PDP) as a light emitting device was prepared by the procedure of the first embodiment, except for using, as a blue-emitting phosphor, the silicate phosphor (B-SMS) having a composition formula of $(Sr_{0.75}Ba_{0.25})_{2.97}MgSi_2O_8:Eu_{0.03}$. The resulting plasma display device can produce a display with high brightness and good color and has a long life.

Fifth Embodiment

A rare gas (xenon gas) discharge white fluorescent lamp as a light emitting device according to the fifth embodiment was prepared by using, as a blue-emitting phosphor, the phosphor of $(Sr_{0.75}Ba_{0.25})_{2.97}MgSi_2O_8:Eu_{0.03}$ (B-SMS) used in the light emitting device according to the fourth embodiment.

Figure 6:
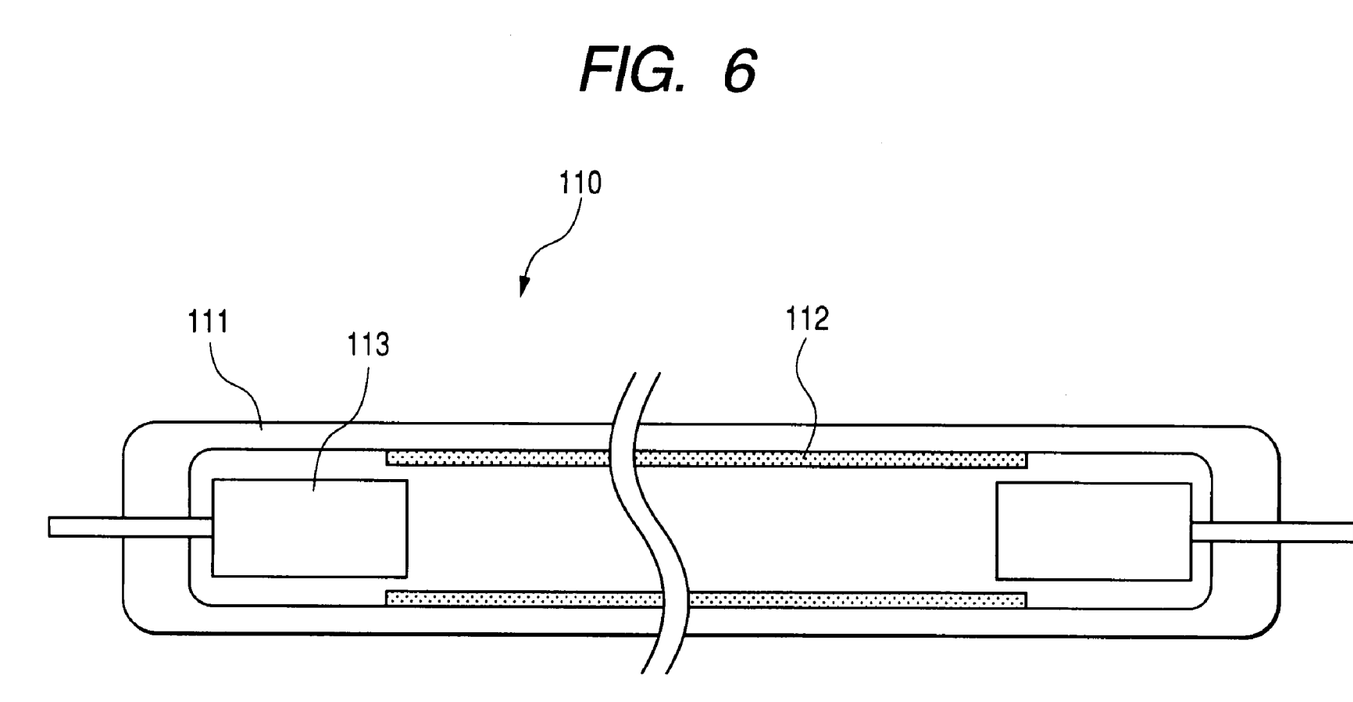
FIG. 6 is a transverse cross section of a rare gas (xenon gas) discharge white luminescent lamp as a fifth embodiment of the present invention.

FIG. 6 is a transverse sectional view of the configuration of the rare gas (xenon gas) discharge white fluorescent lamp as the fifth embodiment of the present invention. The lamp uses the phosphor of $(Sr_{0.75}Ba_{0.25})_{2.97}MgSi_2O_8:Eu_{0.03}$ (B-SMS) used in the light emitting device according to the fourth embodiment.

The rare gas (xenon gas) discharge white fluorescent lamp 110 as a light emitting device according to the present invention comprises a hermetic glass tube 111, xenon gas (not shown) sealed in the glass tube 111, a phosphor layer 112 on an inner wall of the glass tube 111, and electrodes 113 arranged at both ends of the glass tube 111. As a result of discharge between the two electrodes, electric energy is converted into ultraviolet radiation by the action of the xenon gas serving as a discharge gas. The ultraviolet radiation then excites the phosphor constituting the phosphor layer 112 to thereby emit visible light from the phosphor layer 112.

The phosphor layer 112 was prepared by using the silicate phosphor as a blue-emitting phosphor according to the present invention, a manganese(II)-activated zinc silicate phosphor as a green-emitting phosphor, and a europium(III)-activated gadolinium-doped yttrium oxide phosphor as a red-emitting phosphor. The resulting rare gas (xenon gas) discharge white fluorescent lamp 110 is a kind of fluorescence lamps generally called as a three band fluorescent lamp, emits light highly efficiently and has a long life.

Next, a liquid crystal display device 120 as a display device was prepared by using the fluorescent lamp according to the present embodiment as a backlight in combination with a liquid crystal display panel separately prepared.

Figure 7:
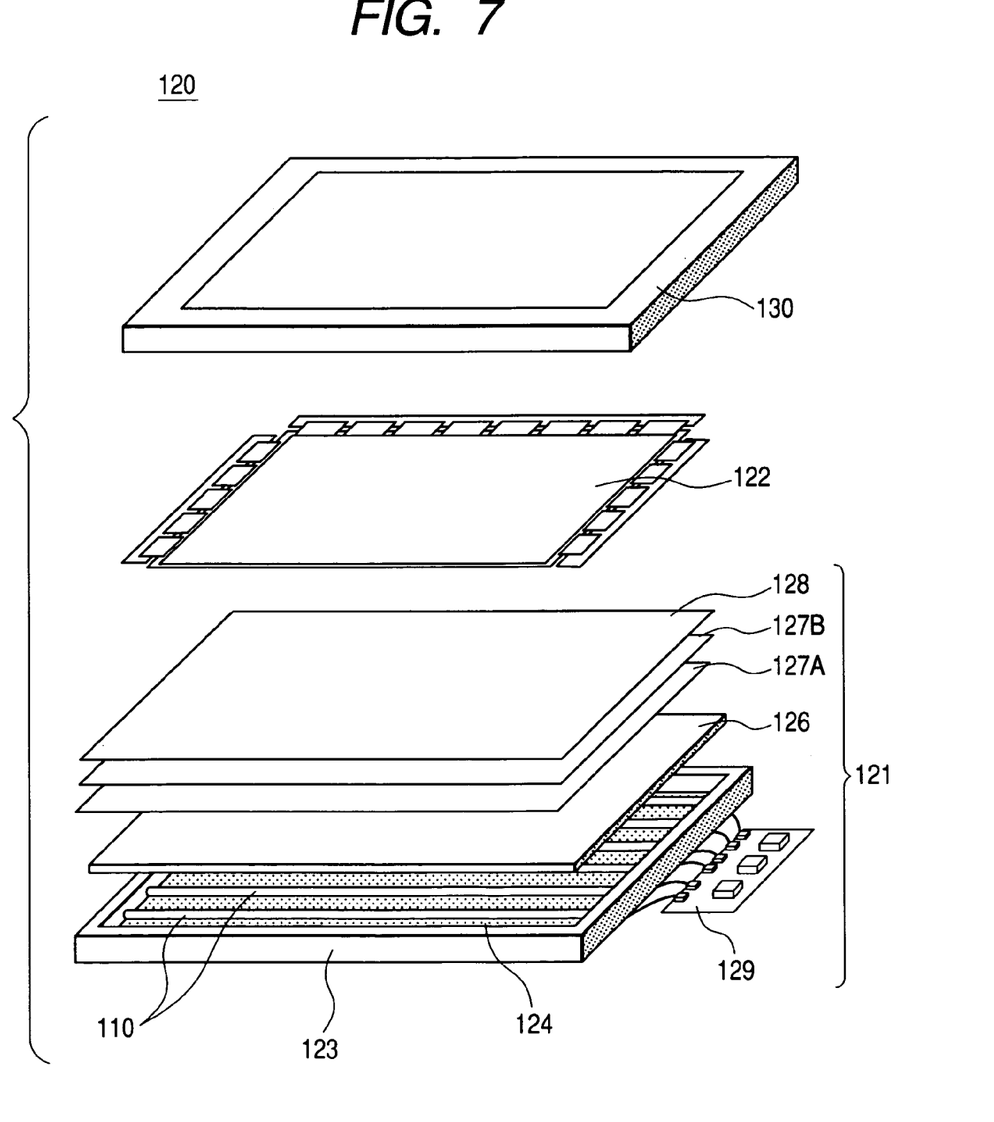
FIG. 7 is an exploded perspective view of a configuration of a liquid crystal display device according to the present invention.

FIG. 7 is an exploded perspective view of the liquid crystal display device using the rare gas (xenon gas) discharge white fluorescent lamp according to the fifth embodiment. The rare gas (xenon gas) discharge white fluorescent lamp uses the phosphor of $(Sr_{0.75}Ba_{0.25})_{2.97}MgSi_2O_8:Eu_{0.03}$ (B-SMS) used in the light emitting device according to the fourth embodiment.

The liquid crystal display device 120 comprises a plurality of rare gas (xenon gas) discharge white fluorescent lamps 110 in a cabinet 123. High-luminance liquid crystal display devices such as liquid crystal display television systems often use fluorescent lamps arranged in a plane directly under a liquid crystal panel.

A reflector 124 is arranged between the cabinet 123 and the fluorescent lamps 110 and serves to utilize light emitted from the fluorescent lamps 110 toward the cabinet 123 efficiently. A diffusing plate 126 is arranged directly above the fluorescent lamps 110 and serves to minimize the in-plane distribution of the brightness in the liquid crystal display device 120. In addition, the liquid crystal display device 120 further includes prism sheets 127A and 127B, and a reflective polarizer 128 for higher brightness.

An inverter 129 is connected to the fluorescent lamps 110 so as to control the lightning of the fluorescent lamps 110 according to necessity. Hereinafter, the fluorescent lamps 110, the cabinet 123, the reflector 124, the diffusing plate 126, the prism sheets 127A and 127B, the reflective polarizer 128, and the inverter 129 are collectively referred to as a backlight unit 121.

Directly above the backlight unit 121 is arranged a liquid crystal panel 122 having color filters for controlling the quantity of transmission of light from the backlight unit 121 and for dispersing the light into red, green and blue light corresponding to each pixel. The liquid crystal panel 122 has an electrode and a thin film transistor (TFT) in each pixel and is so configured as to control the TFT in each pixel independently to thereby produce a color display. More specifically, a voltage is independently applied to each pixel to change the alignment of a liquid crystal to thereby change the refractive index of each pixel. Thus, the transmission of light form the backlight unit 121 is controlled, the controlled light is dispersed with the color filters to thereby produce a color display.

The liquid crystal panel used in the present embodiment is of an in-plane switching (IPS) mode. However, liquid crystal panels of other modes, such as TN mode, VA mode or OCB mode, can also be used.

The liquid crystal panel 122 and the backlight unit 121 were overlaid and then covered by a cabinet 130 to yield the target liquid crystal display device. The liquid crystal display device according to the present embodiment has a high brightness and can produce a bright display.

Sixth Embodiment

A flat-panel rare gas (xenon gas) discharge white fluorescent lamp was prepared by using, as a blue-emitting phosphor, the phosphor of $(Sr_{0.75}Ba_{0.25})_{2.97}MgSi_2O_8:Eu_{0.03}$ (B-SMS) used in the light emitting device according to the fourth embodiment.

The green-emitting phosphor used herein is a manganese (II)-activated zinc silicate phosphor, and the red-emitting phosphor is a europium(III)-activated gadolinium-doped yttrium oxide phosphor.

The resulting lamp has a high brightness and a long life. In addition, a liquid crystal display device was prepared by using the lamp according to the present embodiment as a backlight in combination with a liquid crystal display panel separately prepared. The resulting liquid crystal display device can produce a bright display.

Seventh Embodiment

Initially, a material phosphor was synthetically prepared for the preparation of a plasma display panel according to the seventh embodiment of the present invention. The prepared phosphor has a composition formula of $(Sr_{0.9}Ca_{0.1})_{2.97}MgSi_2O_8:Eu_{0.03}$.

The phosphor was prepared in the following manner. Initially, 3.946 g (26.73 mmol) of $SrCO_3$, 0.297 g (2.97 mmol) of $CaCO_3$, 0.962 g (10.00 mmol) of $MgCO_3$, 1.202 g (20.00 mmol) of $SiO_2$, 0.0528 g (0.15 mmol) of $Eu_2O_3$, and 0.392 g (4.00 mmol) of $NH_4Br$ as a flux were weighed, were fully mixed in an agate mortar, the resulting mixture was charged into a heat-stable vessel and was heated at 1250° C. in a reducing atmosphere for three hours.

The heated product was pulverized, was washed with water, was dried and thereby yielded the silicate phosphor having the above composition (hereinafter referred to as C-SMS). The photoluminescent brightness of the prepared phosphor C-SMS was determined in terms of a relative photoluminescent brightness, namely, the ratio of the photo luminescent brightness of the sample phosphor to that of a comparative sample CMS upon excitation by vacuum ultraviolet light at 172 nm.

The above-prepared C-SMS was found to have a brightness 5.30 times as high as that of the comparative sample CMS, indicating that the former has a high brightness upon excitation at 172 nm. In addition, C-SMS was found to have a brightness higher than the five phosphors used in the first embodiment, i.e., the phosphors having composition formulae of $Sr_{2.98}MgSi_2O_8:Eu_{0.02}$, $Sr_{2.995}MgSi_2O_8:Eu_{0.005}$, $Sr_{2.99}MgSi_2O_8:Eu_{0.01}$, $Sr_{2.95}MgSi_2O_8:Eu_{0.05}$, and $Sr_{2.90}MgSi_2O_8:Eu_{0.10}$.

These results show that the silicate phosphor C-SMS. corresponding to the basic SMS $(Sr_{2.97}MgSi_2O_8:Eu_{0.03})$ except with Ca replacing part of Sr can provide plasma display panels using a Xe-containing discharge gas so as to emit light highly efficiently upon excitation by light at 172 nm. The resulting plasma display devices can use the $Xe_2$ molecular line highly efficiently and have high luminance.

In addition, the phosphor can be suitably applied to "high Xe-content PDP designs" using a discharge gas containing xenon (Xe) gas in a mole fraction of 6% or more, and preferably 10% or more for efficient utilization of the $Xe_2$ molecular line. This enables plasma display panels using a high Xe-content discharge gas and having a higher brightness than those using CMS.

Next, phosphors having composition formulae of $(Sr_{0.8}Ca_{0.2})_{2.97}MgSi_2O_8:Eu_{0.03}$ and $(Sr_{0.7}Ca_{0.3})_{2.97}MgSi_2O_8:Eu_{0.03}$ were synthetically prepared by the above procedure.

The phosphor of $(Sr_{0.8}Ca_{0.2})_{2.97}MgSi_2O_8:Eu_{0.03}$ was prepared by the above procedure, except for using 3.508 g (23.76 mmol) of $SrCO_3$ and 0.595 g (5.94 mmol) of $CaCO_3$. Likewise, the phosphor of $(Sr_{0.7}Ca_{0.3})_{2.97}MgSi_2O_8:Eu_{0.03}$ was prepared using 3.069 g (20.79 mmol) of $SrCO_3$ and 0.892 g (8.91 mmol) of $CaCO_3$.

The y values in xy chromaticity diagram (CIE chromaticity coordinates) of light emitted from the above-prepared phosphors and CMS as a comparative sample were determined so as to determine their color purities upon excitation by vacuum ultraviolet light at 172 nm. The phosphor of $(Sr_{0.8}Ca_{0.2})_{2.97}MgSi_2O_8:Eu_{0.03}$ was found to have a y value equal to or less than that of CMS, but the phosphor of $(Sr_{0.7}Ca_{0.3})_{2.97}MgSi_2O_8:Eu_{0.03}$ was found to have a y value larger than that of CMS, indicating that it has a higher brightness but a lower color purity than those of CMS.

Accordingly, the mole fraction of Ca to the total of Sr and Ca is preferably 20% or less in the C-SMS corresponding to the basic SMS $(Sr_{2.97}MgSi_2O_8:Eu_{0.03})$ except with Ca replacing part of Sr.

Next, a plasma display panel (PDP) as a light emitting device was prepared by the procedure of the first embodiment, except for using, as a blue-emitting phosphor, the silicate phosphor (C-SMS) having a composition formula of $(Sr_{0.90}Ca_{0.10})_{2.97}MgSi_2O_8:Eu_{0.03}$. The resulting plasma display device can produce a display with high brightness and good color and has a long life.

Eighth Embodiment

A rare gas (xenon gas) discharge white fluorescent lamp as a light emitting device was prepared by the procedure of the fifth embodiment, except for using, as a blue-emitting phosphor, the silicate phosphor (C-SMS) having a composition formula of $(Sr_{0.90}Ca_{0.10})_{2.97}MgSi_2O_8:Eu_{0.03}$ used in the light emitting device according to the seventh embodiment.

The lamp was prepared by using, in addition to the blue-emitting phosphor, a manganese (II)-activated zinc silicate phosphor as a green-emitting phosphor, and a europium(III)-activated gadolinium-doped yttrium oxide phosphor as a red-emitting phosphor. The resulting rare gas (xenon gas) discharge white fluorescent lamp has a high emission efficiency and a long life.

Next, a liquid crystal display device as a display device was prepared by the procedure of the fifth embodiment, except for using the lamp according to the present embodiment in combination with a liquid crystal display panel separately prepared. The resulting liquid crystal display device can produce a bright display.

Ninth Embodiment

A flat-panel rare gas (xenon gas) discharge white fluorescent lamp was prepared by using, as a blue-emitting phosphor, the phosphor of $(Sr_{0.90}Ca_{0.10})_{2.97}MgSi_2O_8:Eu_{0.03}$ used in the light emitting device according to the seventh embodiment.

The green-emitting phosphor used herein is a manganese (II)-activated zinc silicate phosphor, and the red-emitting phosphor is a europium(III)-activated gadolinium-doped yttrium oxide phosphor. The resulting lamp has a high brightness and a long life.

In addition, a liquid crystal display device was prepared by using the lamp according to the present embodiment as a backlight in combination with a liquid crystal display panel separately prepared. The resulting liquid crystal display device can produce a bright display.

The present invention enables stable and high-performance displays by using the phosphor materials having a long life and a high brightness and enables larger-sized light emitting devices that can be applied typically to home-use flat-panel display devices which require lightning over a long time and essentially a high brightness and a long life.

What is claimed is:

1. A light emitting device comprising:
   at least one pair of electrodes;
   a discharge gas for emitting ultraviolet light as a result of discharge upon application of a voltage between the at least one pair of electrodes; and
   at least one phosphor layer for emitting light as a result of excitation by the ultraviolet light emitted by the discharge gas,
   wherein the discharge gas contains xenon (Xe) gas in a mole fraction of 6 percent or more,
   wherein the at least one phosphor layer comprises, as a phosphor component thereof, at least an Eu-activated silicate phosphor capable of being excited by ultraviolet light emitted as a result of discharge of the xenon gas to thereby emit light and represented by following Formula (I):

$$M1_{3a-e}Mg_bSi_{2c}O_{8d}:Eu_e \qquad (I)$$

wherein M1 is at least one element selected from the group consisting of Sr, Ca and Ba; and a, b, c, d and e are mole fractions and satisfy the following conditions: $0.8 \leq a \leq 1.2$, $0.8 \leq b \leq 1.2$, $0.8 \leq c \leq 1.2$, $0.8 \leq d \leq 1.2$, and $0.001 \leq e \leq 0.2$, and
   wherein the light emitting device has a plasma display panel structure.

2. The light emitting device according to claim 1, wherein the mole fractions a, b, c and d in Formula (I) are each 1.

3. The light emitting device according to claim 1, wherein the discharge gas contains the xenon gas in a mole fraction of 10 percent or more.

4. The light emitting device according to claim 1, wherein the mole fraction e of Eu in Formula (I) satisfies the following condition: $0.01 \leq e \leq 0.05$.

5. The light emitting device according to claim 1, wherein the mole fraction b of Mg in Formula (I) satisfies the following condition: $1 \leq b \leq 1.2$.

6. The light emitting device according to claim 1, wherein the mole fraction c of Si in Formula (I) satisfies the following condition: $1 \leq c \leq 1.2$.

7. The light emitting device according to claim 1, wherein the light emitting device has a plasma display panel structure and comprises:
   a pair of substrates arranged at a set distance so as to face each other;
   barrier ribs arranged between the pair of substrates for keeping the distance between the pair of substrates;
   at least one pair of electrodes arranged on or above at least one of facing sides of the pair of substrates; and
   a discharge gas being sealed in a space between the pair of substrates and serving to discharge and emit ultraviolet light upon application of a voltage between the at least one pair of electrodes,
   wherein the at least one phosphor layer is arranged on or above at least one of the pair of substrates and/or on or above a surface of the barrier ribs, and
   wherein the light emitting device is so configured that the Eu-activated silicate phosphor is excited by ultraviolet light emitted by the discharge gas to thereby emit light.

8. A light emitting device comprising:
   at least one pair of electrodes;
   a discharge gas for emitting ultraviolet light as a result of discharge upon application of a voltage between the at least one pair of electrodes; and
   at least one phosphor layer for emitting light as a result of excitation by the ultraviolet light emitted by the discharge gas,
   wherein the at least one phosphor layer comprises, as a phosphor component thereof, at least an Eu-activated silicate phosphor represented by following Formula (II):

$$(Sr_{1-x}M2_x)_{3a-e}Mg_bSi_{2c}O_{8d}:Eu_e \qquad (II)$$

wherein M2 is at least one element selected from the group consisting of Ba, Ca, Zn, Mn, Ti, V, Co, Pd, Pt, Ni, Sc, Y, La, Ce, Pr, Nd, Pm, Sm, Gd, Tb, Dy, Ho, Er, Tm, Yb, Sb, Tl and Lu; and a, b, c, d, e and x are mole fractions and satisfy the following conditions: $0.8 \leq a \leq 1.2$, $0.8 \leq b \leq 1.2$, $0.8 \leq c \leq 1.2$, $0.8 \leq d \leq 1.2$, $0.001 \leq e \leq 0.2$, and $0 < x \leq 0.5$, provided that x satisfies the following condition: $0.1 < x \leq 0.5$ when M2 is Ba.

9. The light emitting device according to claim 8, wherein the mole fractions a, b, c and d in Formula (II) are each 1.

10. The light emitting device according to claim 8, wherein the light emitting device is a tubular or flat-panel fluorescent lamp.

11. The light emitting device according to claim 8, wherein the light emitting device is a plasma display panel.

12. The light emitting device according to claim 11, wherein the light emitting device has a plasma display panel structure and comprises:
    a pair of substrates arranged at a set distance so as to face each other;
    barrier ribs arranged between the pair of substrates for keeping the distance between the pair of substrates;
    at least one pair of electrodes arranged on or above at least one of facing sides of the pair of substrates; and
    a discharge gas being sealed in a space between the pair of substrates and serving to discharge and emit ultraviolet light upon application of a voltage between the at least one pair of electrodes,
    wherein the at least one phosphor layer is arranged on or above at least one of the pair of substrates and/or on or above a surface of the barrier ribs, and
    wherein the light emitting device is so configured that the Eu-activated silicate phosphor is excited by ultraviolet light emitted by the discharge gas to thereby emit light.

13. The light emitting device according to claim 12, wherein the discharge gas contains the xenon gas in a mole fraction of 6 percent or more.

14. The light emitting device according to claim 12, wherein the discharge gas contains the xenon gas in a mole fraction of 10 percent or more.

15. A light emitting device comprising:
at least one pair of electrodes;
a discharge gas for emitting ultraviolet light as a result of discharge upon application of a voltage between the at least one pair of electrodes; and
at least one phosphor layer for emitting light as a result of excitation by the ultraviolet light emitted by the discharge gas,
wherein the at least one phosphor layer comprises, as a phosphor component thereof, at least an Eu-activated silicate phosphor represented by following Formula (III):

$$(Sr_{1-x-y}Ba_xM3_y)_{3a-e}Mg_bSi_{2c}O_{8d}:Eu_e \quad (III)$$

wherein M3 is at least one element selected from the group consisting of Ca, Zn, Mn, Ti, V, Co, Pd, Pt, Ni, Sc, Y, La, Ce, Pr, Nd, Pm, Sm, Gd, Tb, Dy, Ho, Er, Tm, Yb, Sb, Tl and Lu; and a, b, c, d, e, x and y are mole fractions and satisfy the following conditions: $0.8 \leq a \leq 1.2$, $0.8 \leq b \leq 1.2$, $0.8 \leq c \leq 1.2$, $0.8 \leq d \leq 1.2$, $0.001 \leq e \leq 0.2$, and $0.1 < x+y \leq 0.5$.

16. The light emitting device according to claim 15, wherein the mole fractions a, b, c and d in Formula (III) are each 1.

17. The light emitting device according to claim 15, wherein the light emitting device is a tubular or flat-panel fluorescent lamp.

18. The light emitting device according to claim 15, wherein the light emitting device is a plasma display panel.

19. The light emitting device according to claim 18, wherein the light emitting device has a plasma display panel structure and comprises:
a pair of substrates arranged at a set distance so as to face each other;
barrier ribs arranged between the pair of substrates for keeping the distance between the pair of substrates;
at least one pair of electrodes arranged on or above at least one of facing sides of the pair of substrates; and
a discharge gas being sealed in a space between the pair of substrates and serving to discharge and emit ultraviolet light upon application of a voltage between the at least one pair of electrodes,
wherein the at least one phosphor layer is arranged on or above at least one of the pair of substrates and/or on or above a surface of the barrier ribs, and
wherein the light emitting device is so configured that the Eu-activated silicate phosphor is excited by ultraviolet light emitted by the discharge gas to thereby emit light.

20. The light emitting device according to claim 19, wherein the discharge gas contains the xenon gas in a mole fraction of 6 percent or more.

21. The light emitting device according to claim 19, wherein the discharge gas contains the xenon gas in a mole fraction of 10 percent or more.

22. A light emitting device comprising:
at least one pair of electrodes;
a discharge gas for emitting ultraviolet light as a result of discharge upon application of a voltage between the at least one pair of electrodes; and
at least one phosphor layer for emitting light as a result of excitation by the ultraviolet light emitted by the discharge gas,
wherein the at least one phosphor layer comprises, as a phosphor component thereof, at least an Eu-activated silicate phosphor represented by following Formula (IV):

$$(Sr_{1-x-y}Ca_xM4_y)_{3a-e}Mg_bSi_{2c}O_{8d}:Eu_e \quad (IV)$$

wherein M4 is at least one element selected from the group consisting of Ba, Zn, Mn, Ti, V, Co, Pd, Pt, Ni, Sc, Y, La, Ce, Pr, Nd, Pm, Sm, Gd, Tb, Dy, Ho, Er, Tm, Yb, Sb, Tl and Lu; and a, b, c, d, e, x and y are mole fractions and satisfy the following conditions: $0.8 \leq a \leq 1.2$, $0.8 \leq b \leq 1.2$, $0.8 \leq c \leq 1.2$, $0.8 \leq d \leq 1.2$, $0.001 \leq e \leq 0.2$, and $0 < x+y \leq 0.2$.

23. The light emitting device according to claim 22, wherein the mole fractions a, b, c and d in Formula (IV) are each 1.

24. The light emitting device according to claim 22, wherein the light emitting device is a tubular or flat-panel fluorescent lamp.

25. The light emitting device according to claim 22, wherein the light emitting device is a plasma display panel.

26. The light emitting device according to claim 25, wherein the light emitting device has a plasma display panel structure and comprises:
a pair of substrates arranged at a set distance so as to face each other;
barrier ribs arranged between the pair of substrates for keeping the distance between the pair of substrates;
at least one pair of electrodes arranged on or above at least one of facing sides of the pair of substrates; and
a discharge gas being sealed in a space between the pair of substrates and serving to discharge and emit ultraviolet light upon application of a voltage between the at least one pair of electrodes,
wherein the at least one phosphor layer is arranged on or above at least one of the pair of substrates and/or on or above a surface of the barrier ribs, and
wherein the light emitting device is so configured that the Eu-activated silicate phosphor is excited by ultraviolet light emitted by the discharge gas to thereby emit light.

27. The light emitting device according to claim 26, wherein the discharge gas contains the xenon gas in a mole fraction of 6 percent or more.

28. The light emitting device according to claim 26, wherein the discharge gas contains the xenon gas in a mole fraction of 10 percent or more.

* * * * *